United States Patent
Sekiguchi et al.

(10) Patent No.: US 11,139,463 B2
(45) Date of Patent: Oct. 5, 2021

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yumiko Sekiguchi, Kawasaki (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 216 days.

(21) Appl. No.: 16/124,574

(22) Filed: Sep. 7, 2018

(65) Prior Publication Data
US 2019/0296325 A1  Sep. 26, 2019

(30) Foreign Application Priority Data

Mar. 23, 2018 (JP) .............................. JP2018-056290

(51) Int. Cl.
*H01M 4/13* (2010.01)
*H01M 4/131* (2010.01)
(Continued)

(52) U.S. Cl.
CPC ....... *H01M 4/131* (2013.01); *H01M 10/0525* (2013.01); *H01M 2004/027* (2013.01); *H01M 2220/20* (2013.01)

(58) Field of Classification Search
CPC ...... H01M 4/131; H01M 4/485; H01M 4/505; H01M 4/502; H01M 2300/0002;
(Continued)

(56) References Cited

U.S. PATENT DOCUMENTS

2013/0266859 A1*  10/2013  Todoriki ............... H01M 4/624
                                                                    429/211
2014/0234733 A1   8/2014  Roev et al.
(Continued)

FOREIGN PATENT DOCUMENTS

JP       2002-324551        11/2002
JP       2007109549 A   *   4/2007
(Continued)

OTHER PUBLICATIONS

Kenji Miyagawa, et al., "Study on Synthesis and Photocatalytic Activity of Titanium Dioxide Particles Coated with Nanoporous Silica," Study of Paint, No. 52, Oct. 2010, 13 Pages (with English Translation).

*Primary Examiner* — Raymond Alejandro
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode including titanium oxide particles, and an aqueous electrolyte. The surfaces of the titanium oxide particles are partially covered with an alkyl-based silane compound. The ratio $I_B/I_A$ of the intensity $I_B$ of the second peak $P_B$ to the intensity $I_A$ of the first peak $P_A$ is within a range of 4 to 10. The first peak $P_A$ is a maximum peak present within a range of 3200 $cm^{-1}$ to 3600 $cm^{-1}$ in an infrared absorption spectrum of the titanium oxide particles. The second peak $P_B$ is a maximum peak present within a range of 565 $cm^{-1}$ to 570 $cm^{-1}$ in the infrared absorption spectrum of the titanium oxide particles.

14 Claims, 14 Drawing Sheets

(51) Int. Cl.
*H01M 10/0525* (2010.01)
*H01M 4/02* (2006.01)

(58) Field of Classification Search
CPC . H01M 2300/0005; H01M 2300/0008; H01M 2300/0011; H01M 2300/0014; H01M 4/134; H01M 4/137; H01M 4/13; H01M 10/0525; H01M 10/052; H01M 2004/027; H01M 2220/20
See application file for complete search history.

(56) References Cited

U.S. PATENT DOCUMENTS

| | | |
|---|---|---|
| 2015/0010814 A1 | 1/2015 | Matsumura et al. |
| 2016/0111700 A1 | 4/2016 | Ikenuma et al. |
| 2017/0077547 A1* | 3/2017 | Takami ................ H01M 4/583 |
| 2017/0271682 A1 | 9/2017 | Matsuno et al. |
| 2017/0271717 A1 | 9/2017 | Yamashita et al. |

FOREIGN PATENT DOCUMENTS

| | | |
|---|---|---|
| JP | 4826199 | 11/2011 |
| JP | 2014-165178 | 9/2014 |
| JP | 2016-023118 | 2/2016 |
| JP | 5904166 | 4/2016 |
| JP | 2016-081922 | 5/2016 |
| JP | 2017-041407 | 2/2017 |
| JP | 2017-174809 | 9/2017 |
| JP | 2017-174810 | 9/2017 |
| JP | 6321287 | 5/2018 |

* cited by examiner

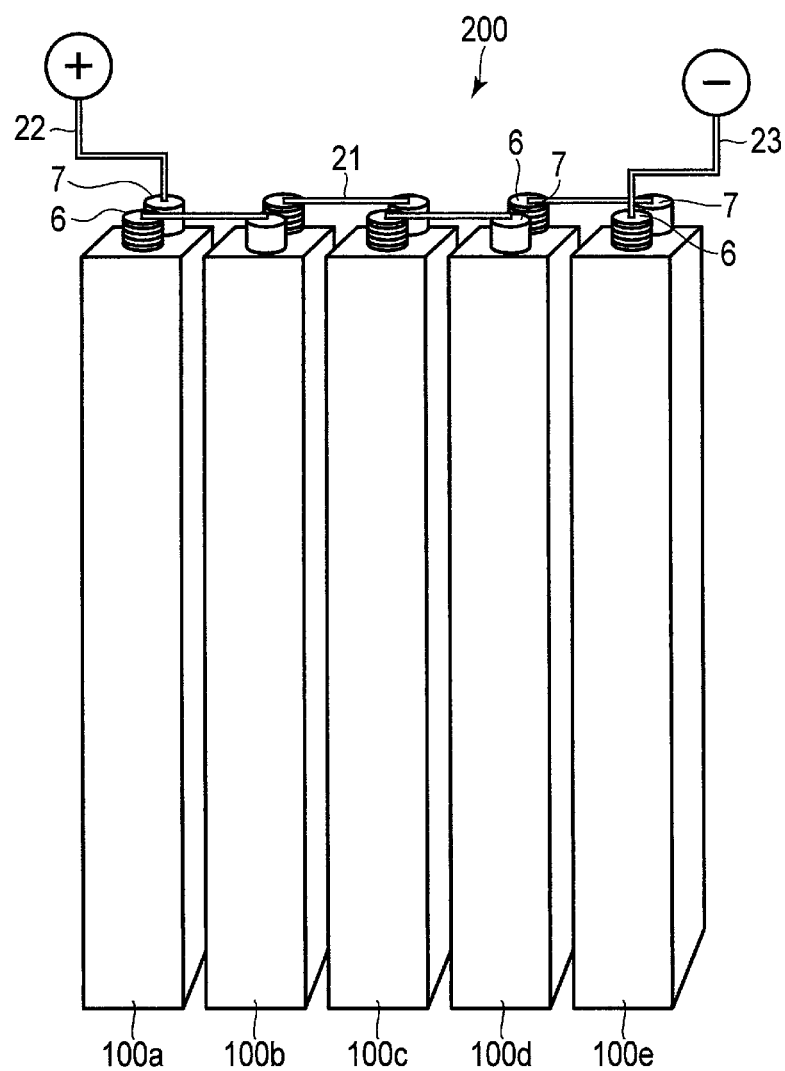
F I G. 5

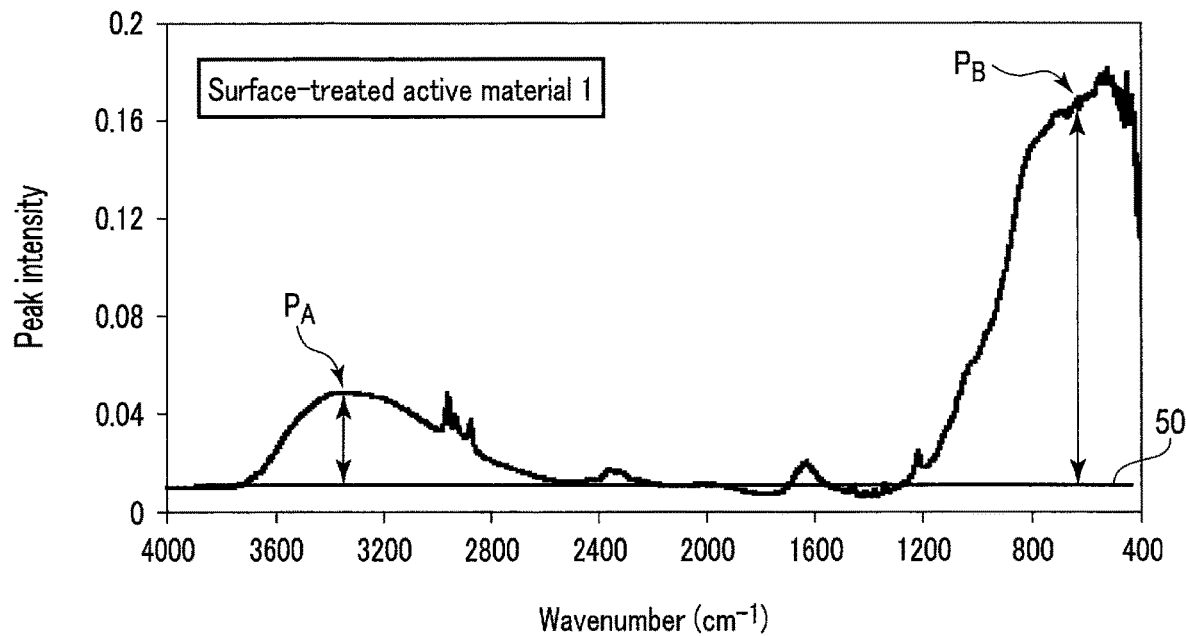
F I G. 10
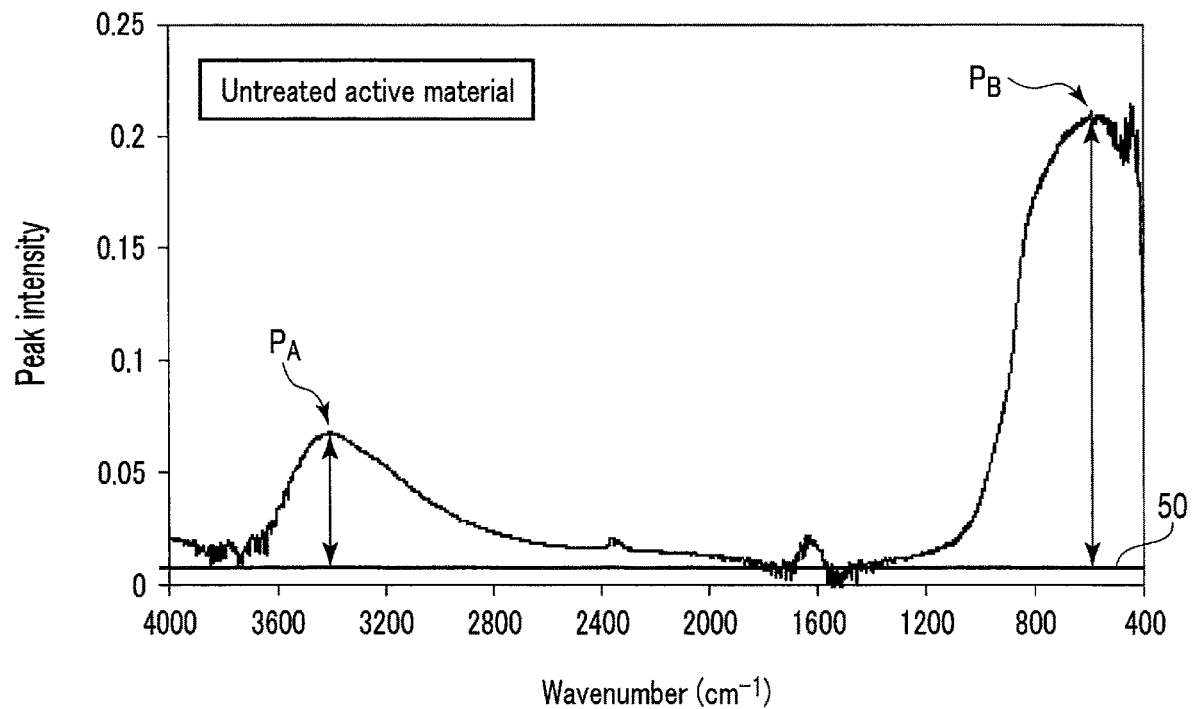
F I G. 11

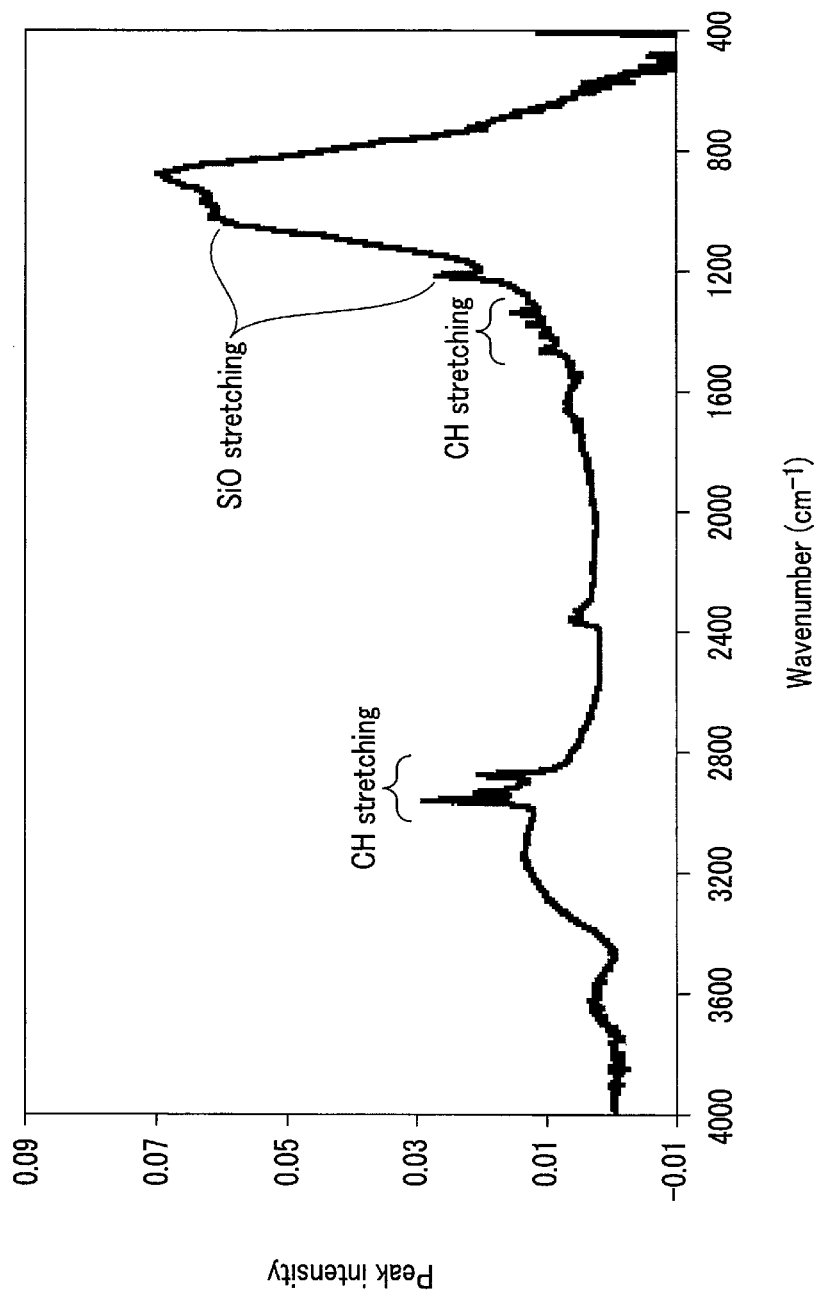
F I G. 12

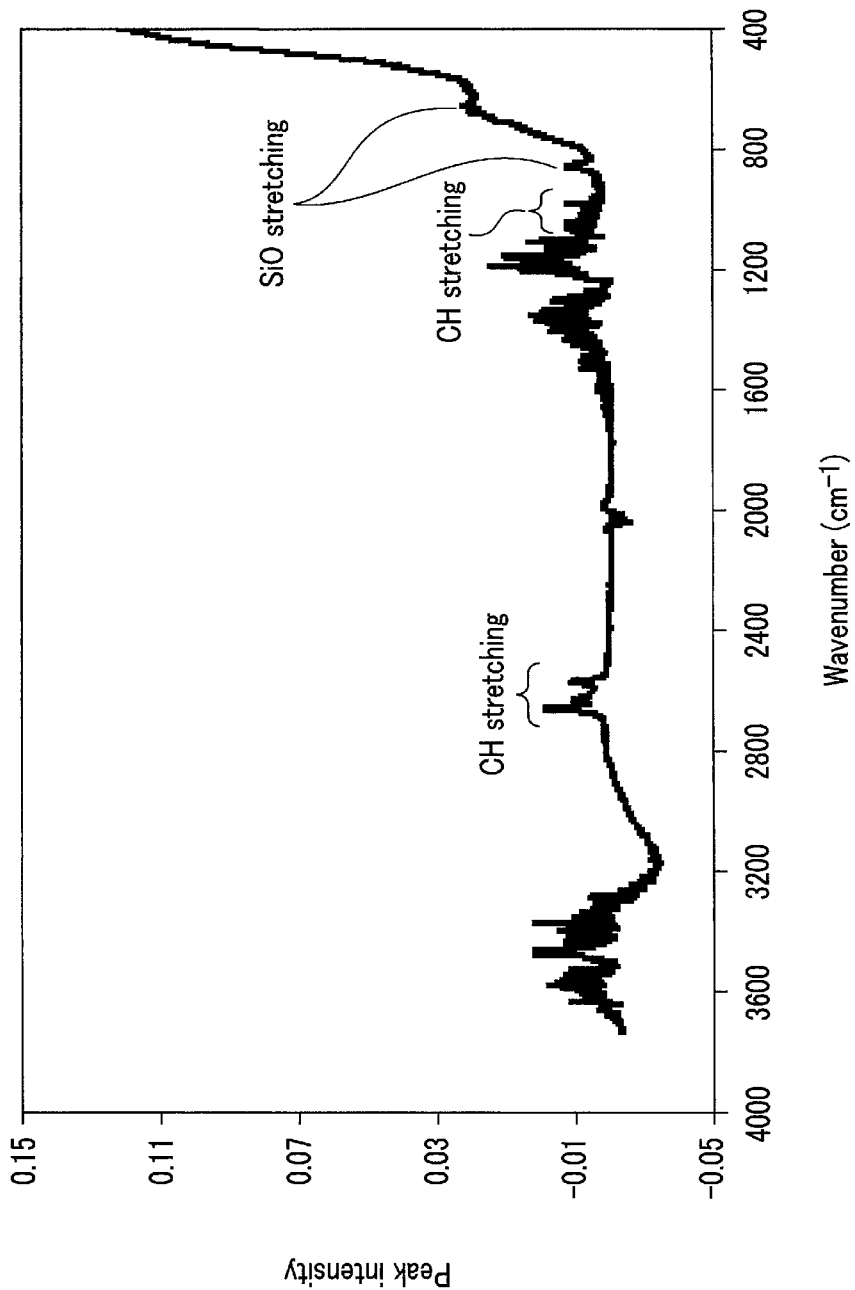
F I G. 15

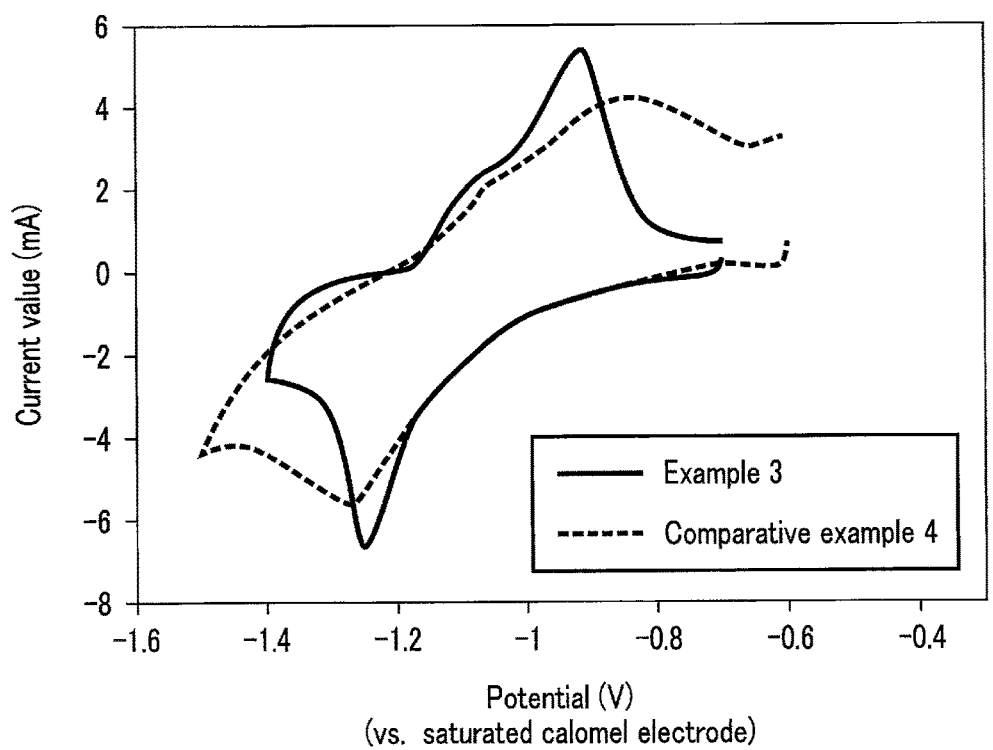
F I G. 18
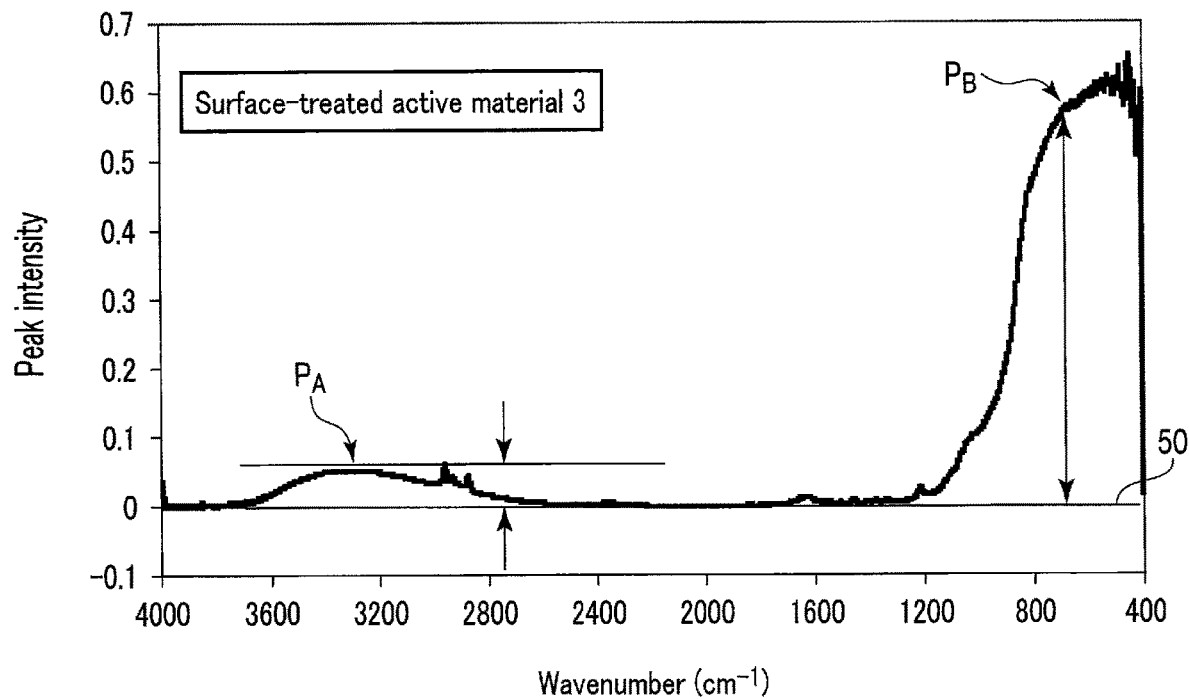
F I G. 19

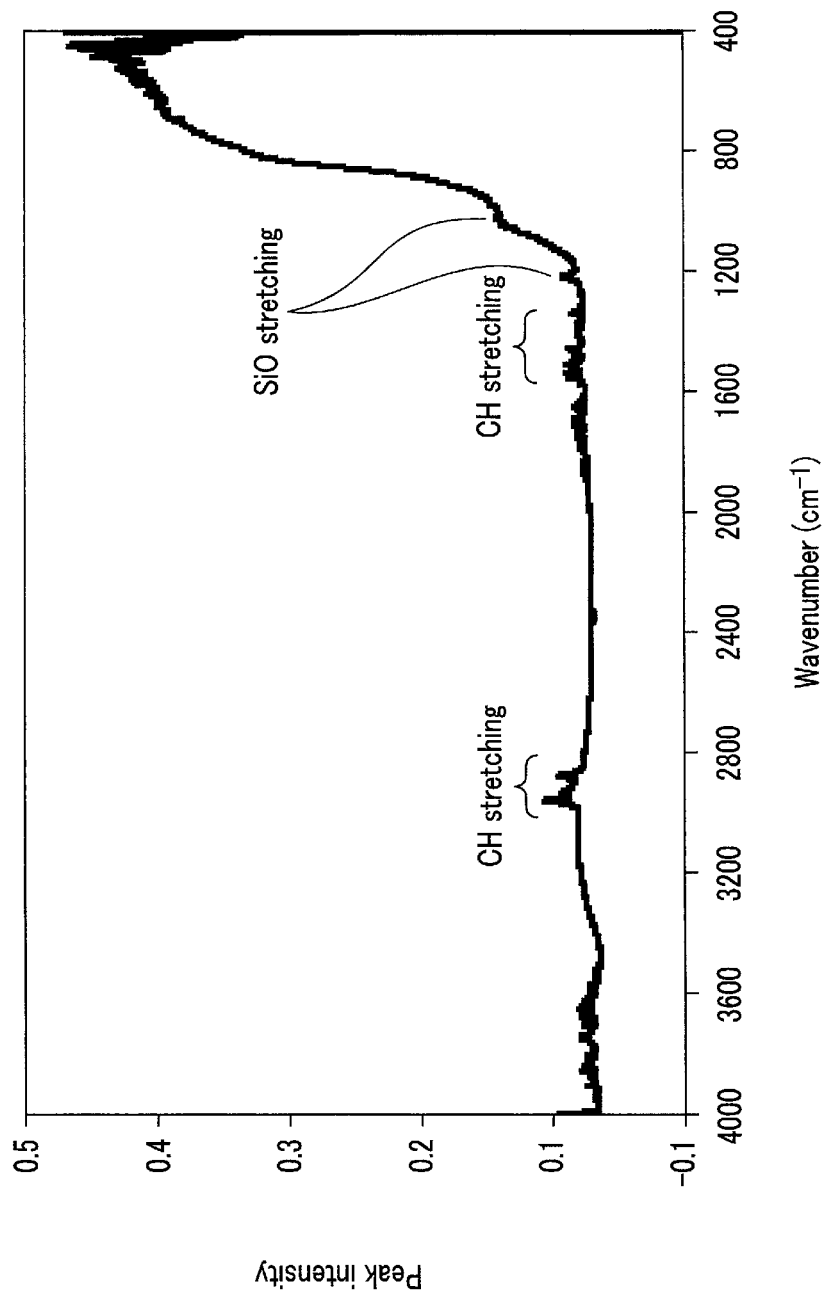
F I G. 20

SECONDARY BATTERY, BATTERY PACK, VEHICLE, AND STATIONARY POWER SUPPLY

CROSS-REFERENCE TO RELATED APPLICATION

This application is based upon and claims the benefit of priority from Japanese Patent Application No. 2018-056290, filed Mar. 23, 2018, the entire contents of which are incorporated herein by reference.

FIELD

Embodiments described herein relate generally to a secondary battery, a battery pack, a vehicle, and a stationary power supply.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric vehicles. As an electrolyte solution of the lithium secondary battery, a nonaqueous organic solvent prepared by mixing ethylene carbonate, methylethyl carbonate and the like is used, different from a nickel-hydrogen battery or a lead storage battery. An electrolyte solution prepared using the solvent has a high oxidation resistance and a high reduction resistant property compared to those of an aqueous electrolyte solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolyte solution containing an organic solvent, various countermeasures have been made, however it is not exactly sufficient. In the production process of the nonaqueous lithium secondary battery, a dry environment is necessary, thereby inevitably increasing the production cost. In addition, the electrolyte solution containing an organic solvent is inferior in electrical conductivity, whereby an internal resistance of the nonaqueous lithium secondary battery is easily increased. Such problems cause large defects of electric vehicles or hybrid electric vehicles and large-sized storage batteries for stationary energy storage, where emphasis is on the battery safety and cost.

In order to solve these problems, a process of converting an electrolyte solution to an aqueous solution has been examined. In the case of the aqueous electrolyte solution, it is necessary that the potential range to perform charge/discharge of a battery is set to the potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 to 1.5 V, an energy density sufficient as a battery is hardly obtained.

A lithium manganese oxide is used as the positive electrode active material and a lithium titanium oxide such as $LiTi_2O_4$ or $Li_4Ti_5O_{12}$ is used as the negative electrode active material so that an electromotive force of from 2.6 to 2.7 V can be theoretically obtained. From the viewpoint of energy density, an attractive battery can be produced. A nonaqueous lithium secondary battery formed by using a combination of the positive and negative electrode materials exhibits an excellent life performance. Such a battery has already been in practical use. However, in the aqueous electrolyte solution, the lithium titanium oxide has a lithium insertion/extraction potential of about 1.5 V (vs. $Li/Li^+$) based on lithium potential, whereby electrolysis is easily caused. Particularly, in a negative electrode, hydrogen is intensely generated by electrolysis on the surface of a metal outer can electrically connected to a negative electrode current collector or the negative electrode. The influence causes the active material to be easily peeled from the current collector. Consequently, such a battery does not operate stably, whereby it is not possible to perform a satisfactory charge-discharge cycle.

BRIEF DESCRIPTION OF THE DRAWINGS

FIG. 5 is a perspective view schematically showing an example of a battery module according to the first embodiment;

FIG. 10 is a diagram showing an infrared absorption spectrum of a surface-treated active material 1 according to an example;

FIG. 11 is a diagram showing an infrared absorption spectrum of an untreated active material according to a comparative example;

FIG. 12 is a graph showing a difference spectrum between the surface-treated active material 1 and the untreated active material;

FIG. 15 is a diagram showing the difference spectrum between the surface-treated active material 2 and the untreated active material;

FIG. 18 is a graph showing cyclic voltammograms according to Example 3 and Comparative Example 4;

FIG. 19 is a view showing the infrared absorption spectrum of a surface-treated active material 3 according to a comparative example; and FIG. 20 is a diagram showing the difference spectrum between the surface-treated active material 3 and the untreated active material.

DETAILED DESCRIPTION

Figure 1:
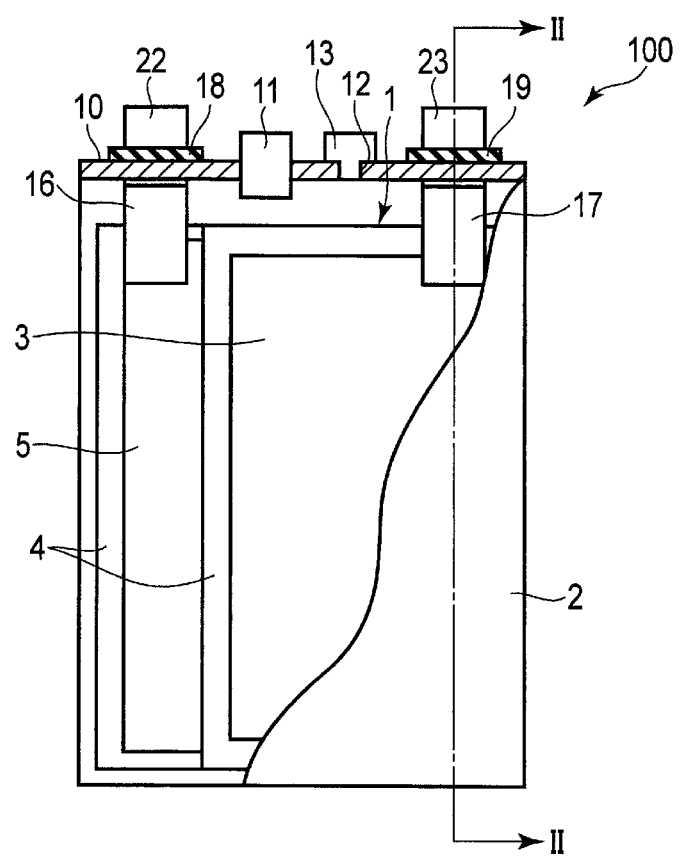
FIG. 1 is a cross-sectional view schematically showing an example of a secondary battery according to a first embodiment.

According to a first embodiment, a secondary battery is provided. The secondary battery includes a positive electrode, a negative electrode including titanium oxide particles, and an aqueous electrolyte. The surfaces of the titanium oxide particles are partially covered with an alkyl-based silane compound. The ratio $I_B/I_A$ of the intensity $I_B$ of the second peak $P_B$ to the intensity $I_A$ of the first peak $P_A$ is within a range of 4 to 10. The first peak $P_A$ is a maximum peak present within a range of 3200 cm$^{-1}$ to 3600 cm$^{-1}$ in an infrared absorption spectrum of the titanium oxide particles obtained by infrared spectroscopy. The second peak $P_B$ is a maximum peak present within a range of 565 cm$^{-1}$ to 570 cm$^{-1}$ in the infrared absorption spectrum.

According to a second embodiment, a battery pack is provided. The battery pack includes the secondary battery according to the first embodiment.

According to a third embodiment, a vehicle is provided. The vehicle includes the battery pack according to the second embodiment.

According to a fourth embodiment, a stationary power supply is provided. The stationary power supply includes a battery pack according to the second embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, a negative electrode including titanium oxide particles, and an aqueous electrolyte. The surfaces of the titanium oxide particles are partially covered with an alkyl-based silane compound. The ratio $I_B/I_A$ of the intensity $I_B$ of the second peak $P_B$ to the intensity $I_A$ of the first peak $P_A$ is within a range of 4 to 10. The first peak $P_A$ is a maximum peak present within a range of 3200 cm$^{-1}$ to 3600 cm$^{-1}$ in an infrared absorption spectrum of the titanium oxide particles obtained by infrared spectroscopy. The second peak $P_B$ is a maximum peak present within a range of 565 cm$^{-1}$ to 570 cm$^{-1}$ in the infrared absorption spectrum.

It is known that in a secondary battery using an aqueous electrolyte, a silane coupling agent (silane compound) can be bonded to the surface of an active material, thereby rendering the surface of the active material hydrophobic. By using a coupling agent having a hydrophobic substituent such as an alkyl group as the silane coupling agent, water molecules can be inhibited from approaching the surface of the negative electrode active material in a secondary battery using an aqueous electrolyte. As a result, electrolysis of water on the negative electrode can be suppressed, and charge and discharge efficiency and cycle life characteristics can be enhanced.

However, after the silane coupling reaction is carried out, an unreacted silane coupling agent and/or a condensed reactant of silane coupling agents may remain on the surface of the active material. If such residues are present on the surface of the active material, the surface of the active material is excessively covered and thus, the affinity between the aqueous electrolyte and the active material is lowered and sufficient battery characteristics cannot be obtained. Alternatively, the residues described above may gradually come off the surface of the active material during battery operation, leading to undesirable results such as interfering with battery operation.

In the secondary battery according to the present embodiment, the surfaces of titanium oxide particles as the negative electrode active material are partially covered with an alkyl-based silane compound, and the titanium oxide particles have in the infrared absorption spectrum measured by infrared spectroscopy (IR) the first peak $P_A$, which is the maximum peak present in the range of 3200 cm$^{-1}$ to 3600 cm$^{-1}$, the second peak $P_B$, which is the maximum peak present in the range of 565 cm$^{-1}$ to 570 cm$^{-1}$, and the third peak $P_C$ present in the range of 2800 cm$^{-1}$ to 3000 cm$^{-1}$. Also, the ratio $I_B/I_A$ of the intensity $I_B$ of the second peak $P_B$ to the intensity $I_A$ of the first peak $P_A$ is in the range of 4 to 10. The analysis method by infrared spectroscopy will be described below.

The first peak $P_A$ is a peak derived from the O—H stretching vibration of the hydroxyl group present on the surfaces of the titanium oxide particles. The second peak $P_B$ is a peak derived from the Ti—O stretching vibration of the titanium oxide particles. The third peak $P_C$ is a peak derived from the C—H stretching vibration of the alkyl group contained in an alkyl-based silane coupling agent. The surfaces of the titanium oxide particles are partially covered with the alkyl-based silane compound so that the third peak $P_C$ appears. Therefore, when the third peak $P_C$ appears, at least a portion of the surface of the active material can be said to be hydrophobic. Here, the third peak $P_C$ refers to a peak group present in the range of 2800 cm$^{-1}$ to 3000 cm$^{-1}$. For example, the third peak $P_C$ is present when, for example, at least three peaks having an intensity ratio of 0.5 or more to the first peak $P_A$ appear within the range of 2800 cm$^{-1}$ to 3000 cm$^{-1}$.

Titanium oxide particles whose ratio $I_B/I_A$ of the intensity $I_B$ of the second peak $P_B$ to the intensity $I_A$ of the first peak $P_A$ in the infrared absorption spectrum is in the range of 4 to 10 have a coating amount by the silane compound within a suitable range. As a result, water molecules are inhibited from approaching the negative electrode active material so that electrolysis of water can be suppressed and also, the affinity between the negative electrode active material and the aqueous electrolyte is good. That is, both permeability of the aqueous electrolyte to the negative electrode and water repellency can be made compatible. Therefore, the secondary battery according to the embodiment is excellent in charge and discharge characteristics and cycle life characteristics.

When the alkyl-based silane coupling agent binds to the surface of the titanium oxide particle, the hydroxyl group present on the surface of the titanium oxide particle is silylated. If the coating amount of the alkyl-based silane compound on the surfaces of the titanium oxide particles is excessively large, the intensity $I_A$ of the first peak $P_A$ derived from the hydroxyl group present on the surfaces of the titanium oxide particles decreases so that the ratio $I_B/I_A$ exceeds 10. Alternatively, also when, as described above, an unreacted silane coupling agent and/or a condensed reactant of silane coupling agents excessively remains on the surface of the negative electrode active material, the intensity $I_A$ of the first peak $P_A$ decreases so that the ratio $I_B/I_A$ exceeds 10.

The intensity $I_B$ of the second peak $P_B$ increases as the surfaces of the titanium oxide particles is covered with the alkyl-based silane compound.

On the other hand, if the covering of the surfaces of the titanium oxide particles with the alkyl-based silane compound is insufficient, the ratio $I_B/I_A$ becomes less than 4 because the intensity $I_A$ of the first peak $P_A$ is large.

The coverage (mass) of the surfaces of the titanium oxide with the alkyl-based silane compounds is in the range of, for example, 0.5% by mass to 1.0% by mass with respect to the total mass of the active material. If the coverage is too low, the ratio $I_B/I_A$ becomes small because the intensity $I_A$ increases, and the electrolysis of water may not be sufficiently suppressible. When the coverage is too high, the ratio $I_B/I_A$ increases because the intensity $I_A$ decreases, and the affinity between the negative electrode active material and the aqueous electrolyte may decrease. When the affinity decreases, the diffusion resistance of the charge carriers between the active material and the electrolyte increases and the charge and discharge characteristics are thereby deteriorated. When the coverage of the surface of the titanium oxide by the alkyl-based silane compound is within the above range, water molecules are inhibited from approaching the negative electrode active material so that electrolysis of water can be suppressed and also, the affinity between the negative electrode active material and the aqueous electrolyte is good.

The alkyl-based silane compound contains a hydrophobic group. The hydrophobic group is, for example, an alkyl group. The alkyl group is, for example, hydrocarbon having one to 10 carbon atoms. The alkyl group may be linear or branched. The alkyl group is at least one group selected from a group consisting of, for example, the methyl, ethyl, propyl, butyl, pentyl, hexyl, heptyl, octyl, nonyl, and decyl. A portion of hydrogen atoms included in the alkyl group may be substituted with a Group 17 element such as fluorine. The ratio of the number of hydrogen atoms that may be substituted to the number of hydrogen atoms contained in the hydrophobic group is, for example, in the range of 10% to 100%. The hydrophobic group may be a trifluoropropyl group.

The alkyl-based silane coupling agent contains at least one selected from a group consisting of, for example, methyltrimethoxysilane, propyltrimethoxysilane, hexyltrimethoxysilane, decyltrimethoxysilane, trimethoxy (3,3,3-trifluoropropyl) silane, dimethyldimethoxysilane, methyltriethoxysilane, and dimethyldiethoxysilane. Among them, a silane coupling agent containing a methyl group, an ethyl group, or a propyl group is preferable because such a silane coupling agent is easily hydrolyzed and a minimum coverage area of those agents are large.

Titanium oxide particles are not particularly limited as long as such particles have the first peak $P_A$, which is the maximum peak present in the range of 3200 cm$^{-1}$ to 3600 cm$^{-1}$, and the second peak $P_B$, which is the maximum peak present in the range of 565 cm$^{-1}$ to 570 cm$^{-1}$, in the infrared absorption spectrum. As described above, the first peak $P_A$ is a peak derived from the O—H stretching vibration of the hydroxyl group present on the surfaces of the titanium oxide particles. The second peak $P_B$ is a peak derived from the Ti—O stretching vibration of the titanium oxide particles.

The Li insertion potential of titanium oxide particles is in the range of, for example, 1 V (vs. Li/Li$^+$) to 3 V (vs. Li/Li). The Li insertion potential of titanium oxide particles is preferably in the range of 1.2 V (vs. Li/Li$^+$) to 2.0 V (vs. Li/Li$^+$). The negative electrode active material can include one or more types of these titanium oxide particles.

Examples of titanium oxide particles include at least one selected from a group consisting of titanium dioxide, lithium titanium composite oxide, sodium titanium composite oxide, aluminum titanium composite oxide and niobium titanium composite oxide.

Examples of the titanium dioxide include a titanium oxide having a monoclinic structure, a titanium oxide having a rutile structure, and a titanium oxide having an anatase structure. As for the titanium oxide having each of the crystal structures, the composition before charge is TiO$_2$ and the composition after charge is Li$_x$TiO$_2$ (x is 0≤x≤1). Further, the structure of the titanium oxide having a monoclinic structure before charge is TiO$_2$ (B) Examples of the lithium titanium oxide include a lithium titanium oxide having a spinel structure (e.g., Li$_{4+x}$Ti$_5$O$_{12}$ (−1≤x≤3); and a lithium titanium oxide having a ramsdellite structure (e.g., Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0≤x≤1). The lithium titanium oxide may be a lithium-titanium composite oxide into which a dopant is introduced.

As the sodium titanium composite oxide, for example, an orthorhombic titanium-containing composite oxide can be cited. The orthorhombic titanium-containing composite oxide includes, for example, a compound represented by Li$_{2+a}$M(I)$_{2-b}$Ti$_{6-c}$M(II)$_d$O$_{14+\sigma}$. Here, M(I) is at least one of elements selected from a group consisting of Sr, Ba, Ca, Mg, Na, Cs, Rb, and K. M(II) is at least one of elements selected from a group consisting of Zr, Sn, V, Nb, Ta, Mo, W, Y, Fe, Co, Cr, Mn, Ni, and Al. Each subscript in the compositional formula satisfies: 0≤a≤6, 0≤b<2, 0≤c<6, 0≤d<6, and −0.5≤σ≤0.5. As a concrete example of the orthorhombic titanium-containing composite oxide, Li$_{2+a}$Na$_2$Ti$_6$O$_{14}$ (0≤a≤6) can be cited.

As the aluminum titanium composite oxide, for example, Al$_2$O$_3$*TiO$_2$ can be cited.

The niobium-titanium composite oxide includes an oxide represented by, for example, Li$_a$TiM$_b$Nb$_{2±\beta}$O$_{7±\sigma}$ (0≤a≤5, 0≤b≤0.3, 0≤β≤0.3, 0≤σ≤0.3, and M is at least one element selected from a group consisting of Fe, V, Mo, Ta).

Titanium oxide preferably includes titanium dioxide. If titanium oxide contains titanium dioxide, surface modification with a silane coupling agent is relatively easy since the hydroxyl group concentration of the surface is high. The titanium oxide may be titanium dioxide. The average primary particle size of the titanium dioxide particles is in the range of, for example, 20 nm to 1 μm.

The titanium oxide particles may be single primary particles, secondary particles as an aggregate of the primary particle, or a mixture of single primary particles and secondary particles. The shape of the particle is not particularly limited and may be, for example, spherical, elliptical, flattened, fibrous or the like.

<Method of Surface Treatment by Silane Coupling>

First, a surface treatment agent (alkyl-based silane coupling agent) and an organic solvent as a hydrolysis solvent are mixed and sufficiently stirred to obtain a solution containing a surface treatment agent. As the organic solvent, for example, alcohol can be used. Next, a dispersion solution in which titanium oxide particles are dispersed in the organic solvent is obtained. The solution containing the surface treatment agent prepared as described above is added to this dispersion solution and heated at 60° C. to 80° C. for one hour to three hours with stirring. The mixture after the reaction is cooled to room temperature and solid content is collected by filtration.

The obtained solid is further washed. Washing can be carried out by, for example, stirring the obtained solid in an organic solvent. As the organic solvent, for example, alcohol can be used. The stirring is carried out, for example, at room temperature for 0.5 to one hour. Then, by distilling off the solvent, titanium oxide particles in which the surfaces are partially covered with the alkyl-based silane coupling agent can be obtained.

Thus, the titanium oxide particles produced by the silane coupling including a washing process have, as described above, a specific peak intensity ratio in the infrared absorption spectrum. That is, the titanium oxide has the first peak $P_A$, which is the maximum peak present in the range of 3200 $cm^{-1}$ to 3600 $cm^{-1}$, the second peak $P_B$, which is the maximum peak present in the range of 565 $cm^{-1}$ to 570 $cm^{-1}$, and the third peak $P_C$ present in the range of 2800 $cm^{-1}$ to 3000 $cm^{-1}$ and the ratio $I_B/I_A$ of the intensity $I_B$ of the second peak $P_B$ to the intensity $I_A$ of the first peak $P_A$ is within the range of 4 to 10.

<Infrared Spectroscopy (IR)>

In order to carry out the infrared spectroscopy, the active material particles can be extracted from the battery, for example, as described below. First, the battery is brought into a discharged state. For example, the battery can be brought into a discharged state by discharging the battery in an environment of 25° C. at 0.1 C to a rated end voltage. Next, the battery in the discharged state is disassembled and an electrode (for example, a negative electrode) is taken out. The taken-out electrode is washed with, for example, pure water.

The active material is extracted from the electrode to obtain a measurement sample. For example, by tearing off the active material containing layer from the current collector and removing the polymer material and the conductive agent contained in the active material containing layer, the active material can be extracted from the electrode. As the extraction process, for example, a Soxhlet extraction method can be cited. The polymer material can be removed and active material particles and a conductive agent such as a carbon material can be extracted by the Soxhlet extraction method. As a solvent for the Soxhlet extraction method, for example, N-methyl-2-pyrrolidone (NMP) can be used. Only active material particles can be separated by subjecting a mixture of the active material particles and the conductive agent obtained by the Soxhlet extraction method to a centrifugal separator to remove the conductive agent.

Infrared spectroscopy can be carried out by the KBr tablet method using TabletMaster manufactured by JASCO ENGINEERING or a device having equivalent functions. ClearDisk is placed on a ClearDisk former and a mini KBr plate is placed in the central portion thereof. An appropriate amount of sample to be measured is placed on the KBr plate and another mini KBr plate is placed thereon. By pressing the mini KBr plates with a press machine, a sample for measurement in which the sample to be measured is dispersed in KBr is obtained. The sample for measurement is placed on a measuring holder of an infrared absorption spectrometer and the spectrum is measured in transmission mode. In this way, an infrared absorption spectrum of the sample to be measured can be obtained.

If there is a slope in the baseline of the obtained spectrum, a baseline correction is made by the data processing function of analysis software. As the analysis software, Spectra Manager Version 2 manufactured by JASCO Corporation can be used. The baseline correction is selected from the correction items in the data processing menu and a correction is made by a straight line approximation connecting both ends of a spectrum with a straight line.

<Identification of Alkyl-Type Silane Coupling Agent>

From the infrared absorption spectrum obtained by the above procedure, the type of the alkyl-based silane compound covering with the surfaces of the titanium oxide can be identified.

Alternatively, by performing EGA-GC/MS (Evolved Gas Analysis-GC/MS) under the following conditions, the type of the alkyl-based silane compound can be identified without extracting the active material from the electrode.

Conditions of generated gas analysis are as described below.

EGA temperature: 60° C. (0 min)–700° C. (1 min), 20° C./min column: Deactivated metal capillary tube (2.5 m, 0.15 mmid)

GC Inlet temperature: 300° C.

Split ratio: 50:1

GC Oven temperature: 300° C.

Carrier gas: helium (0.8 ml/min)

Mass range: m/z 10-700

The thermal desorption (heat extraction) conditions are as described below.

Thermal desorption temperature: 60° C. (0 min)-380° C. (0.1 min), 20° C./min column: Ultra Alloy-5 (30 m, 0.25 mm id, 0.25 μm film thickness)

GC Inlet temperature: 300° C.

Split ratio: 50:1

GC Oven temperature: 35° C. (3 min)-380° C. (5 min), 15° C./min carrier gas: helium (1.0 ml/min)

Mass range: m/z 10-700

Hereinafter, a secondary battery according to the embodiment will be described in detail.

The secondary battery according to the embodiment may further include a separator arranged between the positive electrode and the negative electrode. The positive electrode, the negative electrode, and the separator can constitute an electrode group. An aqueous electrolyte may be held by the electrode group. The secondary battery may further include a container member capable of housing the electrode group and the aqueous electrolyte.

Also, the secondary battery may further include a negative electrode terminal electrically connected to the negative electrode and a positive electrode terminal electrically connected to the positive electrode.

Hereinafter, the negative electrode, the positive electrode, the aqueous electrolyte, the separator, the container member, the negative electrode terminal, and the positive electrode terminal will be described in detail.

(1) Negative Electrode

The negative electrode includes a negative electrode current collector and a negative electrode active material-containing layer supported on one side or both sides of the negative electrode current collector and including an active material, a conductive agent, and a binder.

The negative electrode current collector is preferably aluminum foil or aluminum alloy foil containing at least one element selected from Mg, Ti, Zn, Mn, Fe, Cu, and Si. The aluminum alloy foil may contain only one of these elements or two or more elements. The negative electrode current collector may be in other forms such as a porous body or a mesh.

The negative electrode active material-containing layer is arranged on at least one surface of the negative electrode current collector. For example, the negative electrode active material-containing layer may be arranged on one surface of the negative electrode current collector or the negative electrode active material-containing layer may be arranged on one side and the reverse side of the negative electrode current collector.

As the negative electrode active material, the above-described titanium oxide can be used. That is, a titanium oxide having a portion of its surface covered with an alkyl-based silane coupling agent can be used. The negative electrode active material may contain other active materials.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

A conductive agent is added in order to increase the current-collecting performance and suppress the contact resistance between the active material and the current collector. Examples of the conductive agent include carbonaceous materials such as carbon black such as vapor grown carbon fiber (VGCF) and acetylene black, and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

In the compounding ratios of the negative electrode active material, the conductive agent, and binder in the negative electrode active material-containing layer, it is preferable that the negative electrode active material is in the range of 70% by mass to 95% by mass, the conductive agent is in the range of 3% by mass to 20% by mass, and the binder is in the range of 2% by mass to 10% by mass. When the compounding ratio of the conductive agent is 3% by mass or more, current-collecting performance of the negative electrode active material-containing layer can be improved. When the content of the binder is 2% by mass or more, sufficient electrode strength can be obtained, and when the content of the binder is 10% by mass or less, the insulating part of the electrode can be reduced.

A material that is electrochemically stable at a potential at which alkali metal ions are inserted into and extracted from the negative electrode active material is used for the negative electrode current collector. The negative electrode current collector is preferably made of zinc, copper, nickel, stainless steel, or aluminum, or made of an aluminum alloy containing one or more elements selected from Mg, Ti, Zn, Mn, Fe, Cu, and Si.

The thickness of the negative electrode current collector is preferably in the range of 5 μm to 20 μm. A negative electrode current collector having such a thickness can keep the strength of negative electrode and the reduction of weight in balance.

Also, the negative electrode current collector may include a part on the surface where no negative electrode active material-containing layer is formed. The part can act as a negative electrode tab.

The density of the negative electrode active material-containing layer (excluding the current collector) is preferably in the range of 1.8 g/cm$^3$ to 2.8 g/cm$^3$. A negative electrode in which the density of the negative electrode active material-containing layer is within this range is excellent in energy density and the retention of aqueous electrolyte. The density of the negative electrode active material-containing layer is more desirably in the range of 2.1 g/cm$^3$ to 2.6 g/cm$^3$.

The negative electrode can be produced by, for example, the following method. First, as described above, a silane-coupled negative electrode active material is prepared. The negative electrode active material, a conductive agent, and a binder are suspended in a solvent to prepare a slurry. The slurry is applied to one side or both sides of a negative electrode current collector. Next, the applied slurry is dried to obtain a laminated body of the negative electrode active material-containing layer and the negative electrode current collector. Then, the laminated body is pressed. In this manner, the negative electrode is produced.

Alternatively, a negative electrode is produced by the following method: First, a negative electrode active material, a conductive agent, and a binder are mixed to obtain a mixture thereof. Next, the mixture is molded into a pellet form. Next, a negative electrode can be obtained by arranging these pellets on the negative electrode current collector.

(2) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material and optionally, a conductive agent and a binder.

As the positive electrode active material, for example, an oxide or sulfide can be used. The positive electrode may contain one compound alone as the positive electrode active material or two or more compounds in combination. As an example of the oxide or sulfide, a compound capable of allowing an alkali metal or alkali metal ions inserting thereinto and extracting therefrom can be cited.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0\leq x\leq1$, $0<y<1$, and $Li_xCoPO_4$; $0<x\leq1$), iron sulfates $[Fe_2(SO_4)_3]$, vanadium oxides (e.g., $V_2O_5$), and lithium nickel cobalt manganese composite oxide ($Li_xNi_{1-y-z}Co_yMn_zO_2$; $0<<x\leq1$, $0<y<1$, $0<z<1$, $y+z<1$).

Among the above compounds, examples of more desirable compounds as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). When these compounds are used as the positive electrode active material, the positive electrode potential can be increased.

When a room temperature molten salt is used as the electrolyte of the battery, it is preferable to use a positive electrode active material including lithium iron phosphate, $LixVPO4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably in the range of 0.1 $m^2/g$ to 10 $m^2/g$. A positive electrode active material having the specific surface area of 0.1 $m^2/g$ or more can adequately secure insertion/extraction sites of lithium ions. A positive electrode active material having the specific surface area of 10 $m^2/g$ or less is easy to handle in industrial production and also can ensure charge-and-discharge cycle performance.

The binder is added to fill gaps among the dispersed positive electrode active material and also to bind the positive electrode active material with the positive electrode current collector. Examples of the binder include polytetrafluoro ethylene (PTFE), polyvinylidene fluoride (PVdF), flurorubber, polyacrylic compound, imide compound, carboxyl methyl cellulose (CMC), and CMC salt. One of these may be used as the binder or a combination of two or more may be used as the binder.

The conductive agent is added to improve a current collection performance and to suppress the contact resistance between the positive electrode active material and the positive electrode current collector. Examples of the conductive agent include carbonaceous substances such as vapor grown carbon fiber (VGCF), carbon black such as acetylene black, and graphite. One of these may be used as the conductive agent, or two or more may be used in combination as the conductive agent. The conductive agent may be omitted.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an insulator. Thus, if the amount of the binder to 20% by mass or less, the amount of insulator contained in the electrode decreases, and thereby internal resistance can be decreased.

When a conductive agent is added, the positive electrode active material, and the binder, the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be expressed. Also, by setting the amount of the conductive agent to 15% by mass or less, the ratio of the conductive agent in contact with the electrolyte can be reduced. When this ratio is low, decomposition of the electrolyte can be reduced during storage under high temperatures.

The positive electrode current collector is preferably titanium, aluminum, or an aluminum alloy containing one or more elements selected from Mg, Ti, Zn, Ni, Cr, Mn, Fe, Cu, and Si.

The thickness of the positive electrode current collector is preferably in the range of 5 μm to 20 μm and more preferably 15 μm or less.

Also, the positive electrode current collector may include a part on the surface where no positive electrode active material-containing layer is formed. The part can act as a positive electrode tab.

The positive electrode is produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a laminated body of the positive electrode active material-containing layer and the positive electrode current collector. Then, the laminated body is pressed. In this manner, a positive electrode is produced.

(3) Aqueous Electrolyte

The aqueous electrolyte includes an aqueous solvent and an electrolyte salt. As the aqueous solvent, a solution containing water can be used. The water-containing solvent may be pure water, or a mixed solution or a mixed solvent of water and a material other than water.

The aqueous electrolyte is, for example, an aqueous solution prepared by dissolving an electrolyte salt in an aqueous solvent. The aqueous electrolyte may be a gel-like aqueous electrolyte obtained by combining a polymer material with the aqueous solution. Examples of the polymer material include polyvinylidene fluoride (PVdF), polyacrylonitrile (PAN), polyethylene oxide (PEO) and the like.

The aqueous solution preferably contains 1 mol or more of the aqueous solvent per 1 mol of the electrolyte salt as a solute. More preferably, the amount of aqueous solvent with respect to 1 mol of electrolyte salt is 3.5 mol or more.

That the aqueous electrolyte contains water can be confirmed by gas chromatography-mass spectrometry (GC-MS) measurements. In addition, the salt concentration and the water content in the aqueous electrolyte can be measured by, for example, inductively coupled plasma (ICP) emission spectrometry. The molar concentration (mol/L) can be calculated by measuring a predetermined amount of aqueous electrolyte and calculating the concentration of contained salt. In addition, the numbers of moles of the solute and the solvent can be calculated by measuring the specific gravity of the aqueous electrolyte.

Examples of lithium salt include LiCl, LiBr, LiOH, $Li_2SO_4$, $LiNO_3$, $LiN(SO_2CF_3)_2$ (LiTFSI: lithium bis (trifluoromethanesulfonyl) imide), $LiN(SO_2F)_2$ (LiFSI: lithium bis (fluorosulfonyl) imide), and $LiB[(OCO)_2]_2$ (LiBOB: lithium bis (oxalate) borate). The lithium salt to be used may be one type or two or more types.

Examples of sodium salt include NaCl, $Na_2SO_4$, NaOH, $NaNO_3$, NaTFSA (sodium trifluoromethanesulfonylamide), $NaClO_4$ (sodium perchlorate), tri Na citrate, Na acetate, sodium ascorbate, and Na gluconate. The sodium salt to be used may be one type or two or more types.

Examples of aluminum salt include $AlCl_3$, $Al_2(SO_4)_3$, $Al(NO_3)_3$, $Al(ClO_4)_3$ and $Al(OH)_3$. The aluminum salt to be used may be one type or two or more types.

The pH of the aqueous electrolyte can be appropriately changed, but from the viewpoint of increasing the hydrogen overvoltage, the pH is considered preferable to be on the alkaline side. If the pH is on the alkaline side, the generation of hydrogen can be further suppressed. As a method of adjusting the pH of the aqueous solution to the alkaline side, for example, the addition of LiOH can be cited. However, it is not preferable that the pH exceeds 12 because corrosion of the current collector proceeds. The pH of the aqueous solution is preferably in the range of 2 to 11 and more preferably in the range of 3 to 9.

(4) Separator

The separator is formed from, for example, a porous film containing polyethylene (PE), polypropylene (PP), cellulose, or polyvinylidene fluoride (PVdF) or a synthetic resin nonwoven fabric.

The separator may be, for example, a solid electrolyte in the form of particles. In this case, the separator may further include a polymer material. Examples of the polymer material include the polyether type, polyester type, polyamine type, polyethylene type, silicone type, and polysulfide type.

The solid electrolyte is at least one compound selected from a group consisting of, for example, $Li_2SeP_2S_5$ based glass ceramic of sulfides, an inorganic compound having a perovskite structure, an inorganic compound having an LiSICON structure, an inorganic compound having a NASICON skeleton (for example, LATP described below), amorphous LIPON, and an inorganic compound having a garnet structure.

The solid electrolyte is preferably oxides such as LATP ($Li_{1+x}Al_xTi_{2-x}(PO_4)_3$) ($0.1 \leq x \leq 0.4$) having a NASICON skeleton, amorphous LIPON ($Li_{2.9}PO_{3.3}N_{0.46}$), and $Li_7La_3Zr_2O_{12}$ (LLZ) of garnet type.

The separator preferably has a thickness of 20 μm or more and 100 μm or less and a density of 0.2 g/cm³ or more and 0.9 g/cm³ or less. Within the above ranges, the mechanical strength and the reduction of battery resistance can be balanced and a secondary battery with high output and suppressed internal short circuits can be provided.

(5) Container Member

As the container that receives the positive electrode, negative electrode, and electrolyte, a metal container, a laminate film container or a resin container which is made of polyethylene or polypropylene may be used.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes.

(6) Negative Electrode Terminal

The negative electrode terminal can be formed from a material that is electrochemically stable at the potentials of carrier ions and has a conductive property. Specifically, the material for the negative electrode terminal may contain zinc, copper, nickel, stainless steel or aluminum, or an aluminum alloy containing at least one element selected from Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

As a material of the positive electrode terminal, titanium, aluminum, or an aluminum alloy containing at least one element selected from a group consisting of Mg, Ti, Zn, Mn, Fe, Cu, and Si can be cited. To reduce contact resistance with the positive electrode current collector, the positive electrode terminal is preferably formed from a material similar to that of the positive electrode current collector. When the carrier ions are lithium ions, the positive electrode terminal can be formed from a material electrically stable and having conductivity in a potential range (vs. Li/Li$^+$) of 3 V or more and 4.5 V or less with respect to the oxidation-reduction potential of lithium.

Hereinafter, a secondary battery according to the embodiment will be described more specifically with reference to the drawings.

Figure 2:
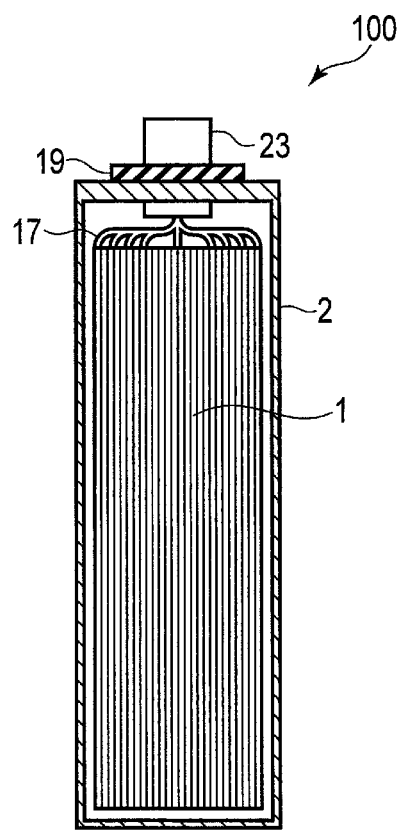
FIG. 2 is an enlarged cross-sectional view showing part A of the secondary battery shown in FIG. 1.

FIG. 1 is a sectional view schematically showing an example of a rectangular secondary battery according to the embodiment. FIG. 2 is a sectional view along a II-II line of the rectangular secondary battery shown in FIG. 1.

An electrode group 1 is received in a rectangular cylindrical metal container 2. The electrode group 1 has a structure in which multiple positive electrodes 5, multiple negative electrodes 3, and multiple separators 4 are stacked in the order of the positive electrode 5, the separator 4, the negative electrode 3, and the separator 4. Alternatively, the electrode group 1 may have a spirally wound flat structure in which the separator 4 is provided between the positive electrode 5 and the negative electrode 3. In the case where the electrode group 1 has either of the structures, it is preferable that the separator 4 is disposed on the outermost layer of the electrode group 1 in order to avoid the contact between the electrode and the metal container 2. An electrolyte (not shown) is supported by the electrode group 1.

As shown in FIG. 2, strip-like negative electrode tabs 17 is electrically connected to each of a plurality of end portions of a negative electrode 3 positioned on the end face of an electrode group 1. Also, though not illustrated, strip-like positive electrode tabs 16 is electrically connected to each of a plurality of end portions of a positive electrode 5 positioned on the end face. A plurality of the negative electrode tabs 17 is electrically connected to a negative electrode lead 23 in a bundled state. The negative electrode tab 17 (negative electrode internal terminal) and the negative electrode lead 23 (negative electrode external terminal) constitute a negative electrode terminal. Further, the positive electrode tabs 16 are connected to a positive electrode lead 22 in a bundled state. The positive electrode tab 16 (positive electrode internal terminal) and the positive electrode lead 22 (positive electrode external terminal) constitute a positive electrode terminal.

A metal sealing plate 10 is secured to an opening part of the metal container 2 by welding. The positive electrode lead 22 and the negative electrode lead 23 are respectively drawn externally from each drawing hole formed in the sealing plate 10. A positive electrode gasket 18 and a negative electrode gasket 19 are respectively disposed on the inner periphery surface of each drawing hole of the sealing plate 10 in order to avoid short circuits developed by the contact between the positive electrode lead 22 and sealing plate 10, and by the contact between the negative electrode lead 23 and sealing plate 10. The airtightness of the rectangular secondary battery can be ensured by disposing the positive electrode gasket 18 and the negative electrode gasket 19.

A control valve 11 (safety valve) is disposed in the sealing plate 10. In the case where the internal pressure of a battery cell is increased due to gas generated by electrolysis of an aqueous solvent, it is possible to diffuse the generated gas from the control valve 11 to the outside. The control valve 11 to be used is, for example, a return control valve which operates when the internal pressure becomes higher than a set value and which functions as a sealing plug when the internal pressure decreases. Alternatively, a non-return valve may be used, where once it is operated, its function as the sealing plug is not recovered. In FIG. 1, the control valve 11 is disposed in the center of the sealing plate 10, and the control valve 11 may be located at the end of the sealing plate 10. The control valve 11 may be omitted.

An injection port 12 is formed in the sealing plate 10. An electrolyte is poured through the injection port 12. The injection port 12 is closed by a sealing plug 13 after pouring the electrolyte. The injection port 12 and the sealing plug 13 may be omitted.

Figure 3:
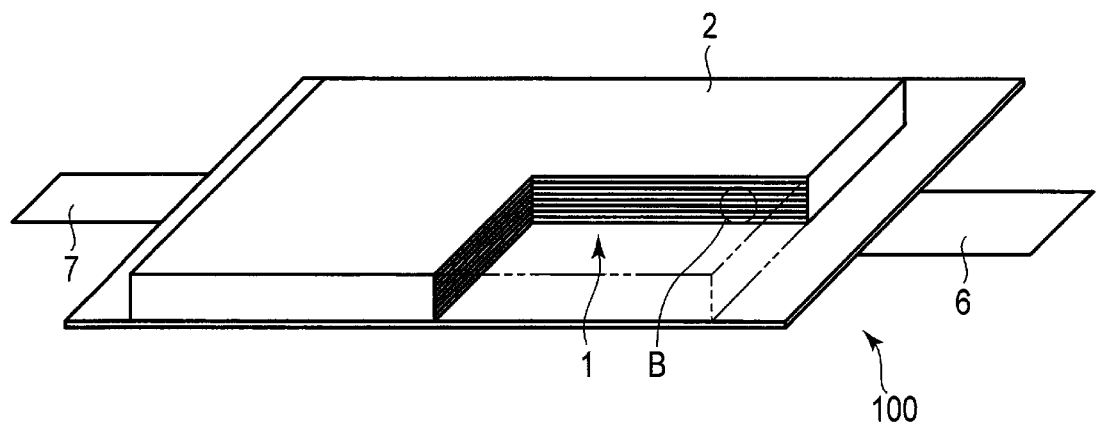
FIG. 3 is a partially cut perspective view schematically showing another example of the secondary battery according to the first embodiment.
Figure 4:
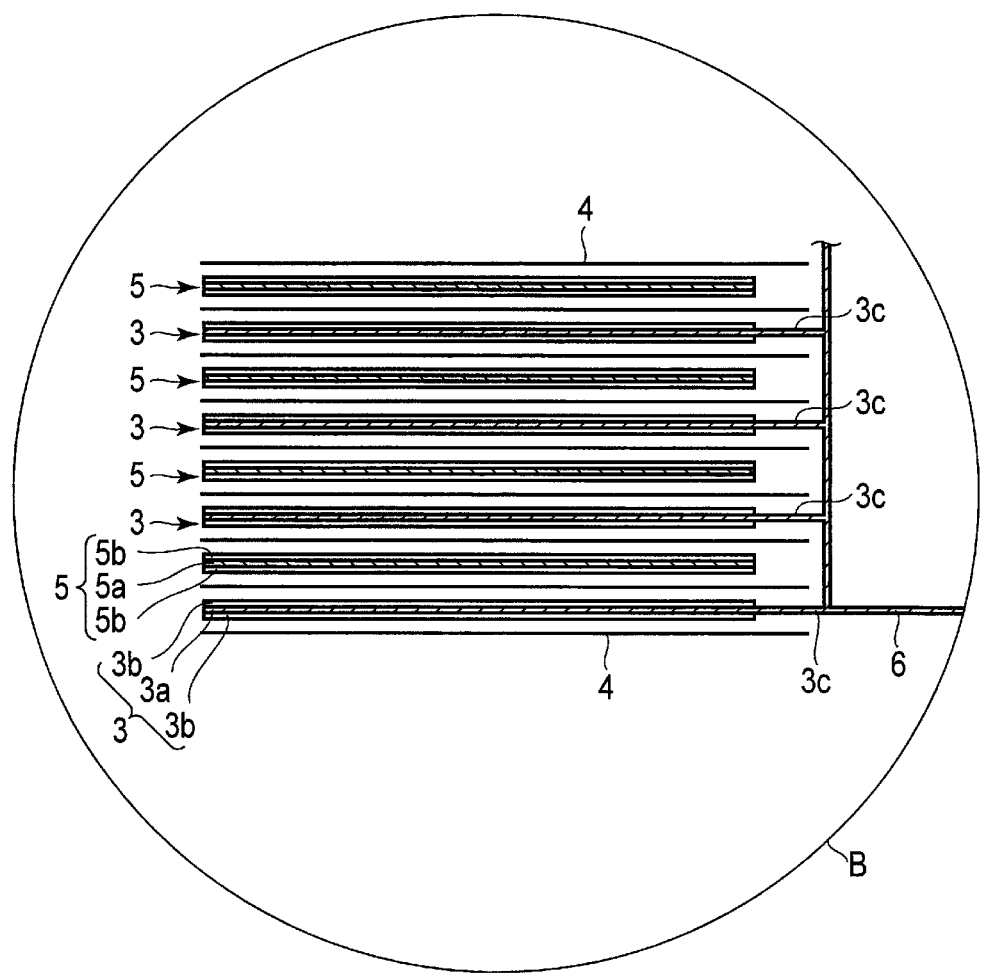
FIG. 4 is an enlarged cross-sectional view showing part B of the secondary battery shown in FIG. 3.

The secondary battery according to the embodiment is not limited to the secondary battery having the structure shown in FIGS. 1 and 2, and may be, for example, a battery having a structure shown in FIGS. 3 and 4.

The secondary battery 100 shown in FIGS. 3 and 4 includes an electrode group 1 shown in FIGS. 3 and 4, a container member 2 shown in FIG. 3, and an aqueous electrolyte (not shown). The electrode group 1 and the aqueous electrolyte are stored in the container member 2. The aqueous electrolyte is held in the electrode group 1.

The container member 2 is made of a laminate film including two resin layers and a metal layer intervening therebetween.

The electrode group 1 shown in FIG. 4 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 4, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

FIG. 5 is a perspective view schematically showing an example of the battery module according to the embodiment. The battery module 200 shown in FIG. 5 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 5 is a battery module of five in-series connection.

As shown in FIG. 5, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100*a* to 100*e* is connected to the negative electrode-side lead 23 for external connection.

A secondary battery according to the first embodiment includes a positive electrode, a negative electrode including titanium oxide particles, and an aqueous electrolyte. The surfaces of the titanium oxide particles are partially covered with an alkyl-based silane compound. The ratio $I_B/I_A$ of the intensity $I_B$ of the second peak $P_B$ to the intensity $I_A$ of the first peak $P_A$ is within a range of 4 to 10. The first peak $P_A$ is a maximum peak present within a range of 3200 cm$^{-1}$ to 3600 cm$^{-1}$ in an infrared absorption spectrum of the titanium oxide particles obtained by infrared spectroscopy. The second peak $P_B$ is a maximum peak present within a range of 565 cm$^{-1}$ to 570 cm$^{-1}$ in the infrared absorption spectrum. Therefore, a secondary battery according to the first embodiment is excellent in charge and discharge characteristics and cycle life characteristics.

Second Embodiment

According to a second embodiment, a battery pack is provided. The battery pack includes the secondary battery according to the first embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 6:
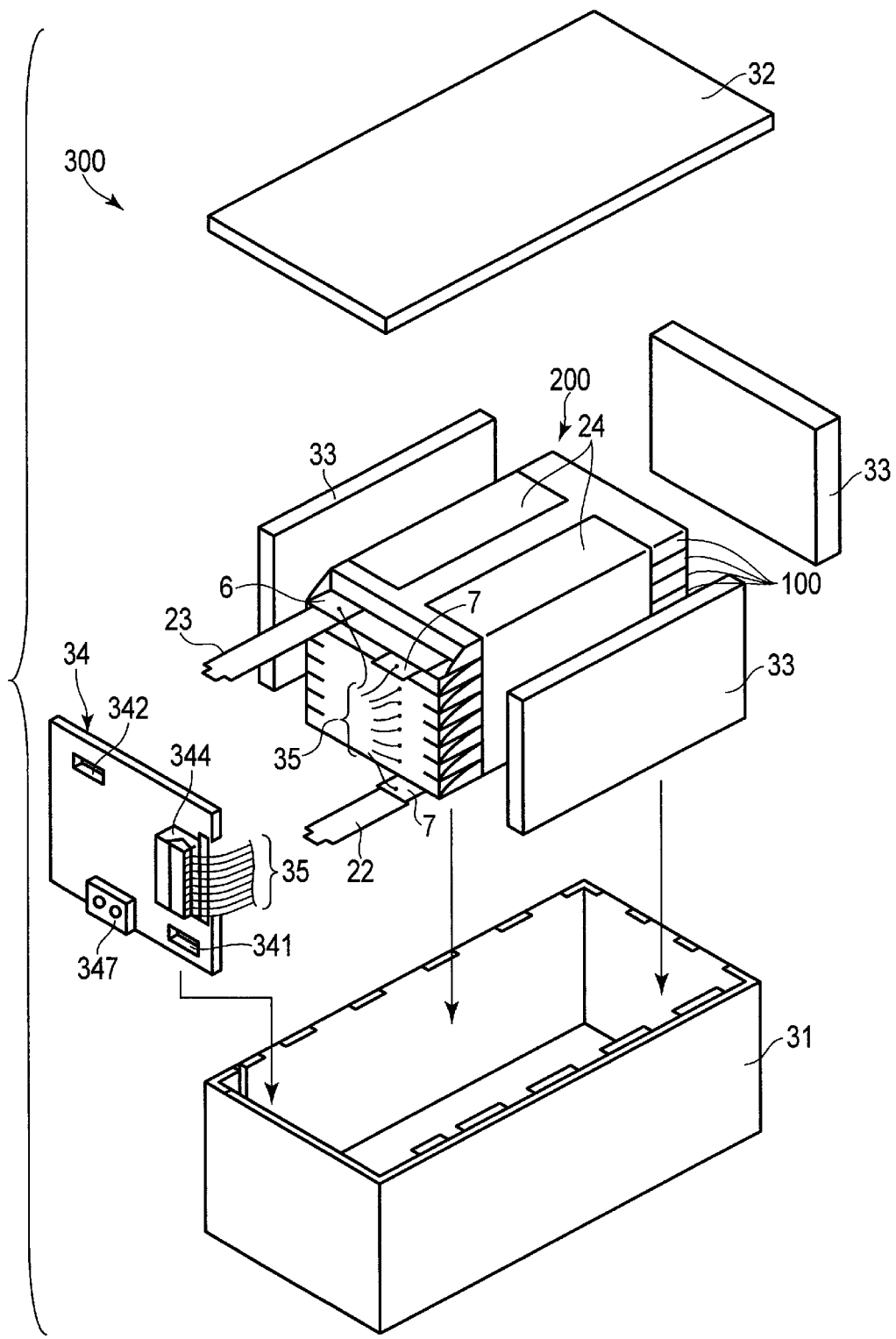
FIG. 6 is a perspective view schematically showing an example of a battery pack according to a second embodiment.
Figure 7:
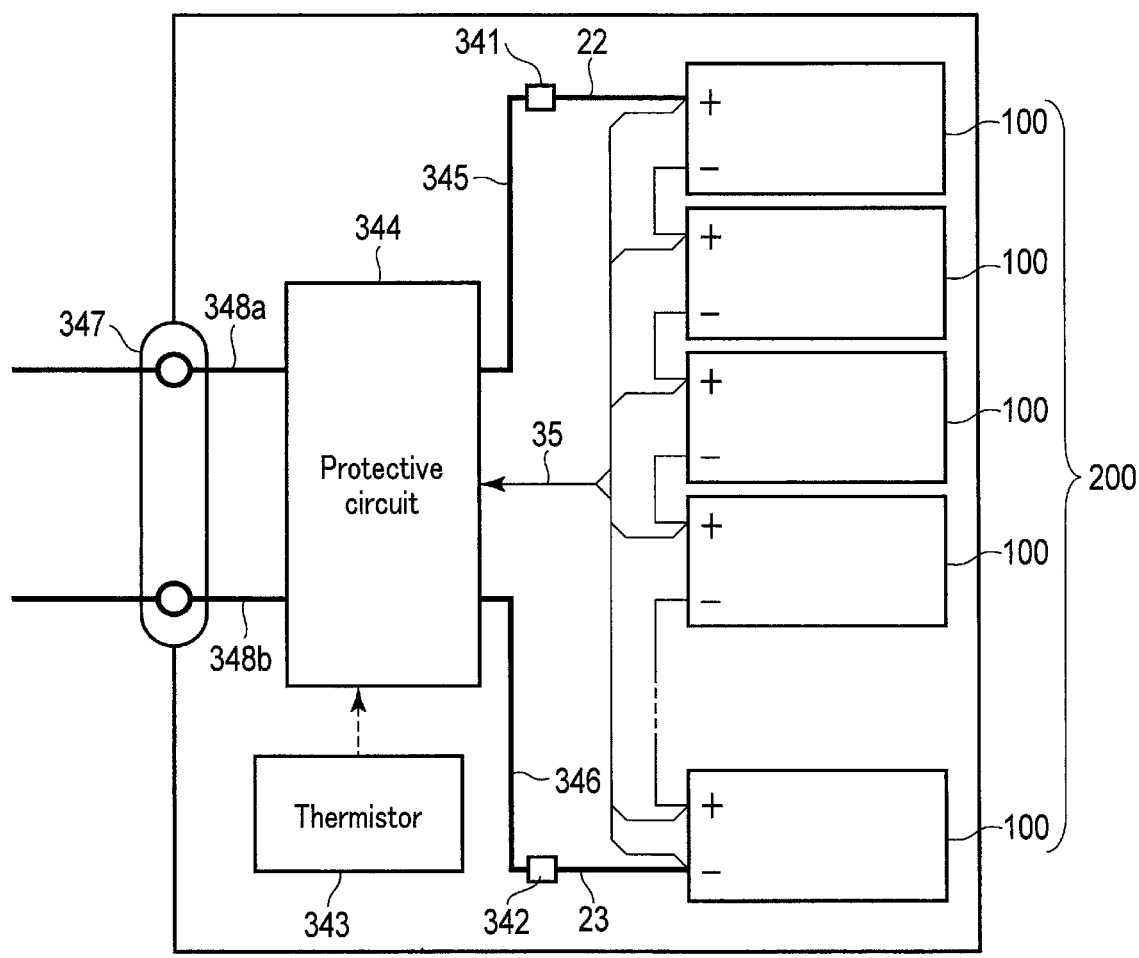
FIG. 7 is a block diagram showing an example of electric circuit of the battery pack shown in FIG. 6.

FIG. 6 is an exploded perspective view schematically showing an example of the battery pack according to the embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

A housing container 31 shown in FIG. 6 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode side lead 22, a negative electrode side lead 23, and an adhesive tape 24.

The battery cell 100 has, for example, a structure shown in FIGS. 1 and 2. At least one of the plural battery cells 100 is a secondary battery according to the first embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 7. The plural battery cells 100 may alternatively be electrically connected in parallel, or connected in a combination of in series connection and in parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat shrinkable tape in place of the adhesive tape 24. In this case, the protective sheets 33 are arranged on both side surfaces of the battery module 200, and the heat shrinkable tape is wound around the battery module 200 and protective sheets 33. After that, the heat shrinkable tape is shrunk by heating to bundle the plural battery cells 100.

One end of the positive electrode side lead 22 is connected to the positive electrode terminal 7 of the battery cell 100 located lowermost in the stack of the battery cells 100. One end of the negative electrode side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode side connector 341, a negative electrode side connector 342, a thermistor 343, a protective circuit 344, wirings 345 and 346, an external power distribution terminal 347, a plus-side (positive side) wire 348*a*, and a minus-side (negative side) wire 348*b*. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode side connector 341 is provided with a through hole. By inserting the other end of the positive electrode side lead 22 into the though hole, the positive electrode side connector 341 and the positive electrode side lead 22 become electrically connected. The negative electrode side connector 342 is provided with a through hole. By inserting the other end of the negative electrode side lead 23 into the though hole, the negative electrode side connector 342 and the negative electrode side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus side wire 348*a*. The protective circuit 344 is connected to the external power distribution terminal 347 via the minus side wire 348b. In addition, the protective circuit 344 is electrically connected to the positive electrode side connector 341 via the wiring 345. The protective circuit 344 is electrically connected to the negative electrode side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over charge, over discharge, and overcurrent of the battery cell(s) 100. When detecting over charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in series connection and in parallel connection. The printed wiring board 34 and the wires 35 may be omitted. In this case, the positive electrode side lead 22 and the negative electrode side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the second embodiment includes the secondary battery according to the first embodiment. Therefore, the battery pack can achieve excellent charge-and-discharge property, and cycle life performance.

Third Embodiment

According to a third embodiment, a vehicle is provided. The vehicle is equipped with the battery pack according to the second embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

Figure 8:
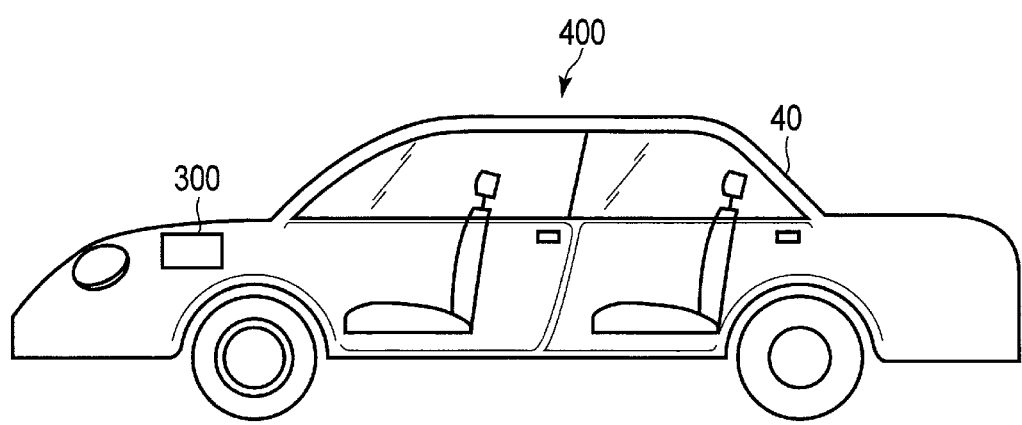
FIG. 8 is a sectional view schematically showing an application example to a vehicle according to a third embodiment as an example of using the battery pack according to the second embodiment.

FIG. 8 is a sectional view schematically showing an example of a vehicle according to the embodiment.

The vehicle 400 shown in FIG. 8 includes a vehicle body 40 and a battery pack 300 according to the second embodiment. The vehicle 400 shown in FIG. 8 is a four-wheel automobile.

This vehicle 400 may have plural battery packs 300 installed. In such a case, the battery packs 300 may be connected in series, connected in parallel, or connected in a combination of in series connection and in parallel connection.

In FIG. 8, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

A vehicle according to the third embodiment includes a battery pack according to the second embodiment. Therefore, according to the present embodiment, a vehicle including a battery pack capable of achieving excellent charge and discharge characteristics and cycle life characteristics can be provided.

Fourth Embodiment

According to a fourth embodiment, a stationary power supply is provided. The stationary power supply includes a battery pack according to the second embodiment. Note that instead of a battery pack according to the second embodiment, the stationary power supply may have a battery module or a secondary battery according to the first embodiment installed therein.

The stationary power supply according to the fourth embodiment includes a battery pack according to the second embodiment. Therefore, the stationary power supply according to the fourth embodiment can exhibit excellent charge and discharge performance and excellent cycle performance.

Figure 9:
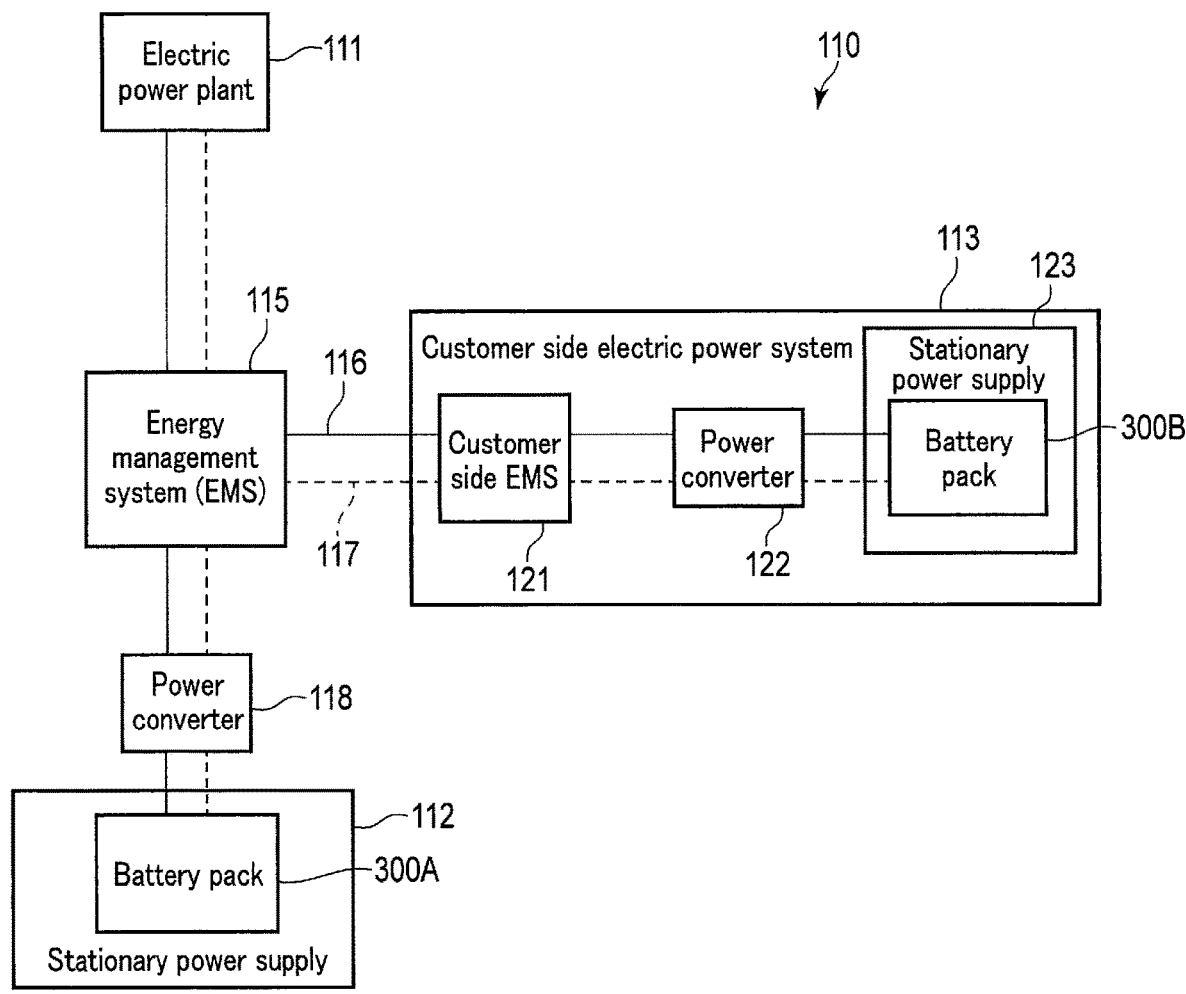
FIG. 9 is a schematic diagram showing an application example to a stationary power supply according to a fourth embodiment as an example of using the battery pack according to the second embodiment.

FIG. 9 is a block diagram showing an example of a system including a stationary power supply according to the fourth embodiment. FIG. 9 is a diagram showing an application example to stationary power supplies 112, 123 as an example of use of battery packs 300A, 300B according to the second embodiment. In the example shown in FIG. 9, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

A stationary power supply according to the fourth embodiment includes a battery pack according to the second embodiment. Therefore, according to the present embodiment, a stationary power supply including a battery pack capable of achieving excellent charge and discharge characteristics and cycle life characteristics can be provided.

EXAMPLES

Examples are explained below, but the embodiments are not limited to Examples described below.

Example 1

Example 1 is an example in which cyclic voltammetry was carried out using a "surface-treated active material 1" described below as a negative electrode active material and an aqueous solution of lithium chloride as an electrolytic solution.

<Surface Treatment of Negative Electrode Active Material> n-propyltrimethoxysilane (0.96 g) as an alkyl-type silane coupling agent and a mixture (30 ml) of ethanol and water as a hydrolysis solvent obtained by mixing at a volume ratio of 9:1 were added to an eggplant type flask (50 ml) equipped with a magnetic stirrer and the solution was stirred at room temperature for 1.5 hours. In this way, a solution containing a silane coupling agent was prepared.

An eggplant type flask (100 ml) equipped with a magnetic stirrer was also prepared and 3 g of $TiO_2$ nanoparticles having an average primary particle size of 25 nm and 18 ml of ethanol were added thereto and stirred to prepare a dispersion. The $TiO_2$ nanoparticles used was contained titanium dioxide of the anatase structure and titanium dioxide of the rutile structure in a mass ratio of 8:2.

20 ml of the solution containing the silane coupling agent prepared previously was added to the dispersion and stirred at 60° C. for 3.5 hours to cause a silane coupling reaction. After returning the reaction mixture to room temperature, the solvent was removed by suction filtration. The separated solid was subjected to washing as follows. The mixture was put into a beaker (100 ml) equipped with a magnetic stirrer, ethanol (30 ml) was added thereto, and the mixture was stirred at room temperature for 0.5 hours. The ethanol was removed by suction filtration and the solid content was separated. From the separated solid, the solvent was distilled off under reduced pressure to obtain the surface-treated active material 1.

<Infrared Absorption Spectrum Measurement>

Infrared absorption spectra were measured by the KBr tablet method using TabletMaster manufactured by JASCO ENGINEERING according to the infrared spectroscopy (IR) described in the first embodiment. FIG. 10 shows the infrared absorption spectrum of the surface-treated active material 1. The horizontal axis of the infrared absorption spectrum shown in FIG. 10 is the wavenumber ($cm^{-1}$) and the vertical axis is the peak intensity (Abs). On the other hand, FIG. 11 shows the infrared absorption spectrum of the active material before surface treatment, that is, TiO$_2$ nanoparticles. The active material of TiO$_2$ nanoparticles not subjected to surface treatment is referred to as an "untreated active material" in the present specification. Further, FIG. 12 shows a difference spectrum obtained by subtracting the spectrum of the untreated active material from the spectrum of the surface-treated active material 1.

As is clear from the spectrum of FIG. 12, in the surface-treated active material 1, a peak (third peak P$_C$) of CH stretching vibration derived from the alkyl-based silane coupling agent appeared. Also, a peak of Si—O stretching vibration derived from a bonding portion between the TiO$_2$ surface and the alkyl-based silane compound appeared. That is, it is clear that the surface-treated active material 1 is active material particles obtained as a result of silane coupling reaction.

Also, as shown in FIG. 10, the first peak P$_A$, which is the maximum peak present within the range of 3200 cm$^{-1}$ to 3600 cm$^{-1}$, and the second peak P$_B$, which is the maximum peak present within the range of 565 cm$^{-1}$ to 570 cm$^{-1}$, appeared in the infrared absorption spectrum of the surface-treated active material 1. The second peak P$_B$ appeared at a position of 567 cm$^{-1}$. The peak intensity I$_A$ of the first peak P$_A$ was 0.03842. The peak intensity I$_B$ of the second peak P$_B$ was 0.1708. Therefore, for the surface-treated active material 1, the ratio I$_B$/I$_A$ of the intensity I$_B$ of the second peak P$_B$ to the intensity I$_A$ of the first peak P$_A$ was 4. Incidentally, the peak intensity I$_A$ of the first peak P$_A$ and the peak intensity I$_B$ of the second peak P$_B$ represent the height from a baseline 50 to each peak top shown in FIG. 10.

<Production of Negative Electrode>

1.0 g of the surface-treated active material 1 previously prepared as a negative electrode active material, 0.1 g of graphite as a conductive agent, 0.25 g of NMP dispersion of PTFE (solid content: 40% by weight) as a binder (binder resin), and 2.4 g of NMP (N-methyl-2-pyrrolidone) were put into a plastic ointment container. The mixture was mixed for four minutes using a kneading machine to obtain a gray slurry. Using an applicator having a gap thickness of 340 μm and to which a Kapton tape having a thickness of 50 μm was attached, the slurry was applied onto an Al plate whose surface had been subjected to anodic oxidation treatment. The laminated body with the applied slurry was placed on a hot plate at 120° C. and the solvent was distilled off. Then, the laminated body was pressed with an initial load of 1 kN/cm$^2$ at a sweep rate of 0.5 mm/sec using a small roll press machine. The coating weight of the obtained negative electrode was 33 g/m$^2$.

<Cyclic Voltammetry>

Figure 13:
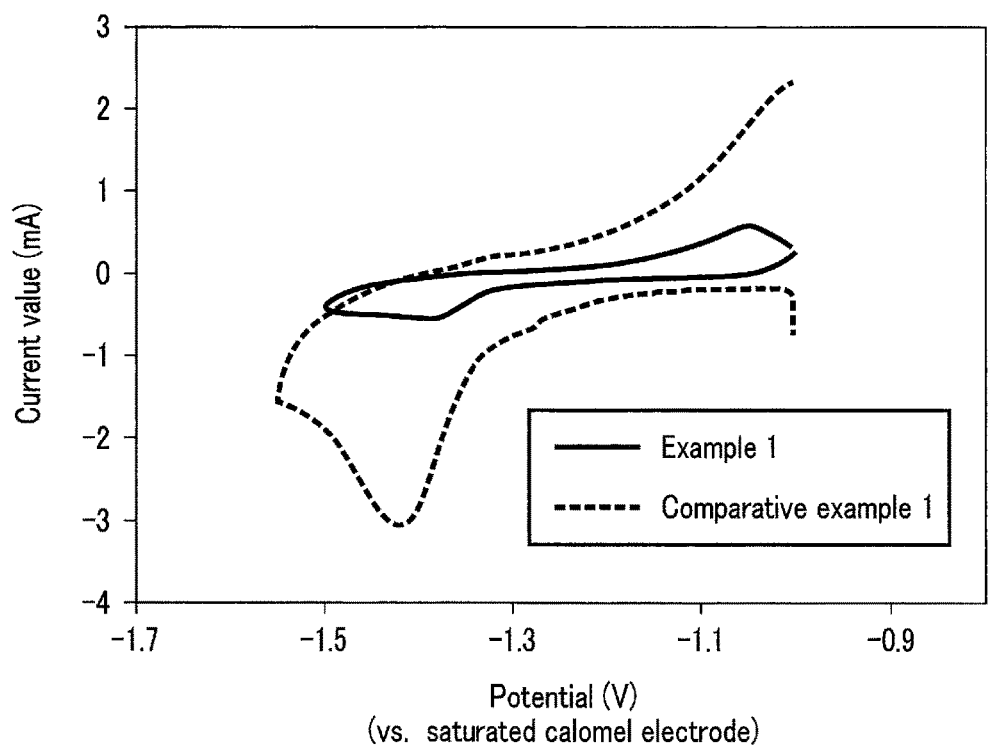
FIG. 13 is a graph showing cyclic voltammograms according to Example 1 and Comparative Example 1.

Using the negative electrode produced by the above method as a working electrode, a platinum wire of 5 mm as a counter electrode, and a saturated calomel electrode as a reference electrode, these electrodes were placed into an evaluation cell (plate electrode evaluation cell manufactured by BAS). 0.7 ml of a 9 mol/L aqueous solution of lithium chloride was added thereto as an electrolytic solution. The cyclic voltammogram was measured using HSV-100 manufactured by Hokuto Denko Corp., in a measurement range of −1.0 V to −1.55 V at a sweep rate of 2 mV/sec. FIG. 13 shows a cyclic voltammogram according to Example 1. For comparison, FIG. 13 also shows a cyclic voltammogram according to Comparative Example 1 to be described below. In the cyclic voltammogram of FIG. 13, the horizontal axis represents the potential (V) (vs. saturated calomel electrode) and the vertical axis represents the current value (mA). The lithium insertion potential of Example 1 is −1.38 V, which is nobler compared with −1.42 V of Comparative Example 1. That is, in the electrode of Example 1, the insertion reaction of lithium is more ascendant than the generation of hydrogen by electrolysis of water as compared with Comparative Example 1. In a system using an aqueous solution with a high lithium chloride concentration, for example, electrolysis of water occurs at −1.7 V to −1.8 V (vs. saturated calomel electrode). Therefore, a secondary battery according to Example 1 is superior to Comparative Example 1 in charge and discharge characteristics and cycle life characteristics.

Example 2

Example 2 is an example in which a constant current charge and discharge test was performed using a "surface-treated active material 2" described below as a negative electrode active material and an aqueous solution of sodium chloride as an electrolytic solution.

<Surface Treatment of Negative Electrode Active Material> n-propyltrimethoxysilane (0.98 g) as an alkyl-type silane coupling agent and a mixture (30 ml) of ethanol and water as a hydrolysis solvent obtained by mixing at a volume ratio of 9:1 were added to an eggplant type flask (50 ml) equipped with a magnetic stirrer and the solution was stirred at room temperature for 1.5 hours. In this way, a solution containing a silane coupling agent was prepared.

Another eggplant type flask (100 ml) equipped with a magnetic stirrer was also prepared and 3 g of TiO$_2$ nanoparticles having an average primary particle size of 25 nm and 20 ml of ethanol were added thereto and stirred to prepare a dispersion.

20 ml of the solution containing the silane coupling agent prepared previously was added to the dispersion and stirred at 60° C. for 2.5 hours to cause a silane coupling reaction. After returning the reaction mixture to room temperature, the solvent was removed by suction filtration. The separated solid was subjected to washing as follows. The mixture was put into a beaker (100 ml) equipped with a magnetic stirrer, ethanol (20 ml) was added thereto, and the mixture was stirred at room temperature for 0.75 hours. The ethanol was removed by suction filtration and the solid content was separated. The solvent was distilled off from the separated solid under reduced pressure to obtain the surface-treated active material 2.

<Infrared Absorption Spectrum Measurement>

Figure 14:
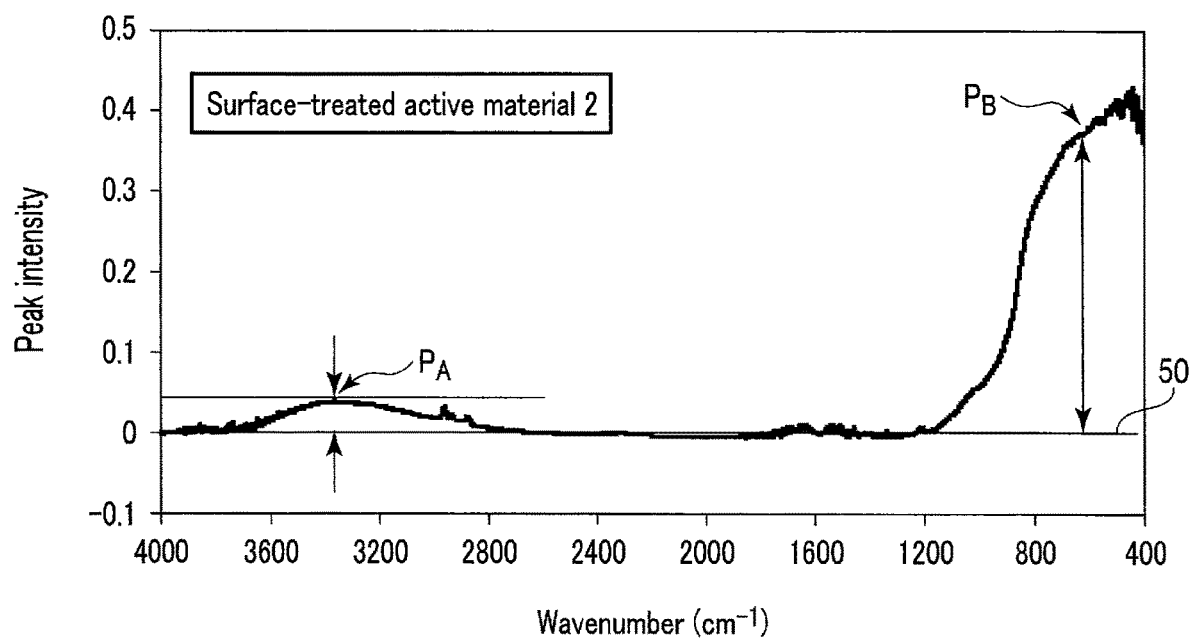
FIG. 14 is a diagram showing the infrared absorption spectrum of a surface-treated active material 2 according to an example.

Infrared absorption spectra were measured by the KBr tablet method using TabletMaster manufactured by JASCO ENGINEERING according to the infrared spectroscopy (IR) described in the first embodiment. FIG. 14 shows the infrared absorption spectrum of the surface-treated active material 2. Further, FIG. 15 shows a difference spectrum obtained by subtracting the spectrum of the untreated active material shown in FIG. 11 from the spectrum of the surface-treated active material 2.

As is clear from the spectrum of FIG. 15, in the surface-treated active material 2, a peak (third peak P$_C$) of CH stretching vibration derived from the alkyl-based silane coupling agent appeared. Also, a peak of Si—O stretching vibration derived from a bonding portion between the TiO$_2$ surface and the alkyl-based silane compound appeared. That is, it is clear that the surface-treated active material 2 is active material particles obtained as a result of silane coupling reaction.

Also, as shown in FIG. 14, the first peak P$_A$, which is the maximum peak present within the range of 3200 cm$^{-1}$ to 3600 cm$^{-1}$, and the second peak P$_B$, which is the maximum peak present within the range of 565 cm$^{-1}$ to 570 cm$^{-1}$, appeared in the infrared absorption spectrum of the surface-treated active material 2. The second peak P$_B$ appeared at a position of 567 cm$^{-1}$. The peak intensity I$_A$ of the first peak P$_A$ was 0.0375. The peak intensity I$_B$ of the second peak P$_B$ was 0.3888. Therefore, for the surface-treated active material 2, the ratio I$_B$/I$_A$ of the intensity I$_B$ of the second peak P$_B$ to the intensity I$_A$ of the first peak P$_A$ was 10. Incidentally, the peak intensity I$_A$ of the first peak P$_A$ and the peak intensity I$_B$ of the second peak P$_B$ represent the height from a baseline 50 to each peak top shown in FIG. 14.

<Production of Negative Electrode>

1.0 g of the surface-treated active material 2 previously prepared as a negative electrode active material, 0.1 g of graphite as a conductive agent, 0.25 g of NMP dispersion of PTFE (solid content: 40% by weight) as a binder (binder resin), and 1.8 g of NMP (N-methyl-2-pyrrolidone) were put into a plastic ointment container. The mixture was mixed for five minutes using a kneading machine to obtain a gray slurry. The slurry was applied onto an Al plate (2 cm×2 cm) whose surface had been subjected to anodic oxidation treatment, and the application is performed by using an applicator having a gap thickness of 280 μm. The laminated body with the applied slurry was placed on a hot plate at 120° C. and the solvent was distilled off. Then, the laminated body was pressed with an initial load of 1 kN/cm$^2$ at a sweep rate of 0.5 mm/sec using a small roll press machine. Next, the pressed laminated body was dried in a vacuum oven at 130° C. for two hours to obtain a negative electrode.

<Production of Positive Electrode>

2.0 g of LiCoO$_2$ as a positive electrode active material, 0.066 g of acetylene black as a conductive agent, 0.034 g of graphite, and 2.0 g of PVDF dispersion (NMP solution whose solid content ratio is 5%) as a binder (binder resin) were put into an plastic ointment container. The mixture was mixed for five minutes using a kneading machine to obtain a black viscous slurry. The slurry was applied to one side of Ti foil of 20 μm in thickness using an applicator whose gap thickness was 120 μm and then, a solvent was distilled on a hot plate at 120° C. to obtain a laminated body. Next, the laminated body was pressed with an initial load of 0.5 kN/cm$^2$ at a stretching rate of 0.5 mm/sec using a small roll press machine. Then, the laminated body was dried for 16 hours in a vacuum oven at 120° C. and then, stamped into a circular shape of 10 mm in diameter. The coating weight of the obtained positive electrode was 145 g/m$^2$ and the density thereof was 2.4 g/cm$^3$.

<Preparation of Electrolytic Solution>

70 mL of pure water was put into a beaker (300 mL) into which a magnetic stirrer was put. When 26.2 g (0.45 mol) of sodium chloride was gradually added thereto while stirring pure water, sodium chloride did not completely dissolve and a small amount thereof remained undissolved. The obtained suspension was transferred to a measuring flask (100 mL) and pure water was added up to the marked line to obtain a saturated sodium chloride solution.

<Constant Current Charge and Discharge Test>

A Ti plate as a conducting body and an aluminum plate whose surface was anodized were covered with tape made of plastics to prevent contact with an electrolytic solution. Next, the positive electrode and the negative electrode were opposed via filter paper made of cellulose (No. 5C for microfiltration), and the positive electrode and the negative electrode were crimped onto the Ti plate and the aluminum plate whose surface was anodized respectively and fixed to a plastic plate using screws. The electrode body was placed into a voltammetry cell and the inside thereof was filled with an electrolytic solution (saturated sodium chloride solution). A reference electrode was inserted and a constant current charge and discharge test was performed. The charge/discharge efficiency was calculated from an obtained result according to Formula (1) described below:

$$\text{Charge/discharge efficiency (\%)}=100\times\{\text{discharge capacity (mAh/g)/charge capacity (mAh/g)}\} \quad (1)$$

Figure 16:
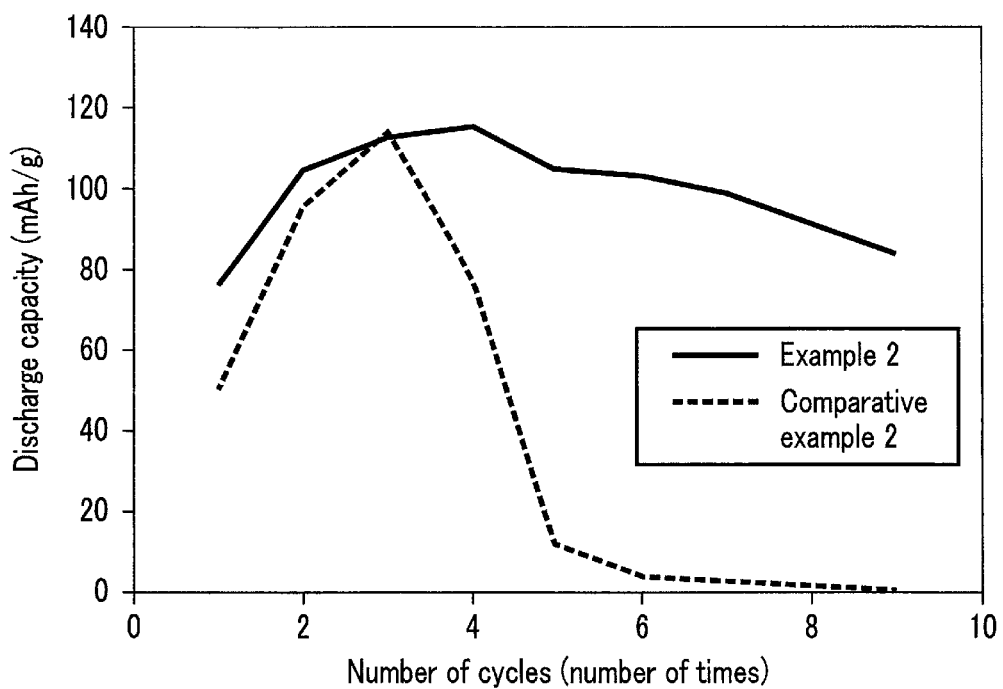
FIG. 16 is a graph showing results of discharge capacity measurements according to Example 2 and Comparative Example 2.
Figure 17:
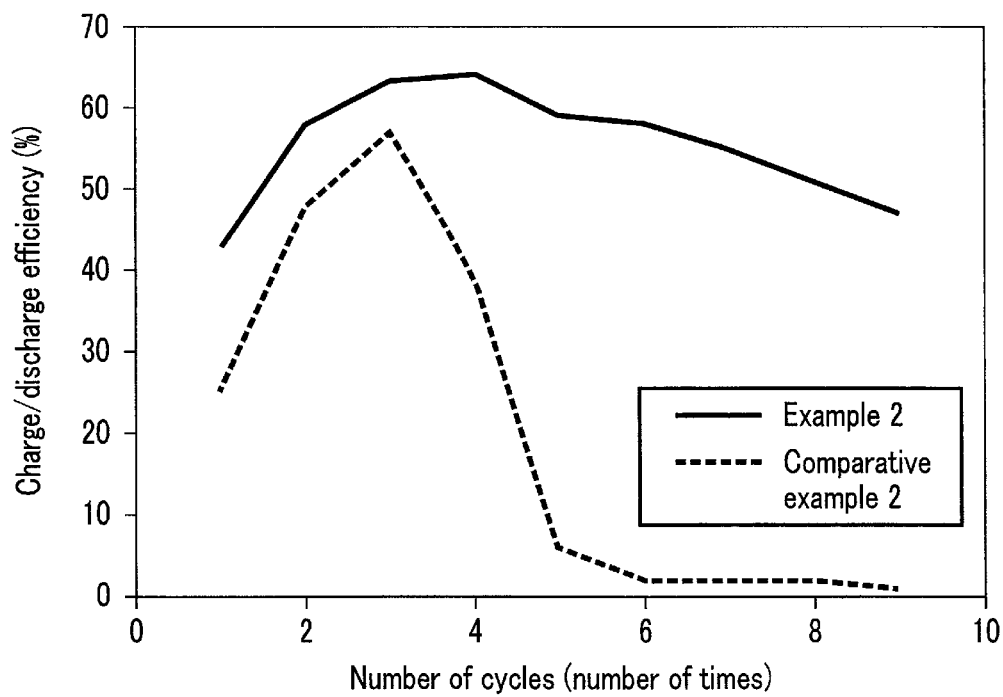
FIG. 17 is a graph showing results of charge/discharge efficiency measurements according to Example 2 and Comparative Example 2.

In FIG. 16, a graph in which the horizontal axis represents the number of cycles (times) and the vertical axis represents the discharge capacity (mAh/g) is shown. In FIG. 17, a graph in which the horizontal axis represents the number of cycles (times) and the vertical axis represents the charge/discharge efficiency (%) is shown. In FIGS. 16 and 17 also show the results of Comparative Example 2 to be described below for comparison. Because Example 2 was superior in both of discharge capacity and charge and discharge efficiency, as compared with Comparative Example 2 using an untreated active material, Example 2 using the surface-treated active material 2 was excellent in charge and discharge characteristics. Further, in Example 2, even if the number of cycles increased, degradation of charge/discharge efficiency and discharge capacity did not occur easily. Therefore, Example 2 was also excellent in cycle life characteristics as compared with Comparative Example 2.

Example 3

Example 3 is an example in which cyclic voltammetry was carried out using the "surface-treated active material 2" produced as described above as a negative electrode active material and an aqueous solution of aluminum chloride as an electrolytic solution.

<Production of Negative Electrode>

A negative electrode was produced in the same manner as in Example 2. That is, as the active material of the negative electrode according to Example 3, the surface-treated active material 2 was used.

<Preparation of Electrolytic Solution>

70 mL of pure water was put into a beaker (300 mL) into which a magnetic stirrer was put. While stirring pure water, 13.3 g (0.10 mol) of aluminum chloride was gradually added thereto. The obtained solution was transferred to a measuring flask (100 mL) and pure water was added up to the marked line and well stirred to obtain 1 mol/L of an aqueous solution of aluminum chloride.

<Cyclic Voltammetry>

Using a negative electrode produced in Example 2 as described above as a working electrode, a platinum wire of 5 mm as a counter electrode, and a saturated calomel electrode as a reference electrode, these electrodes were placed into an evaluation cell (plate electrode evaluation cell manufactured by BAS Inc.). 0.7 ml of a 1 mol/L aqueous solution of aluminum chloride was added thereto as an electrolytic solution. The cyclic voltammogram was measured using HSV-100 manufactured by Hokuto Denko Corp., in a measurement range of −0.7 V to −1.4 V at a sweep rate of 10 mV/sec. FIG. 18 shows a cyclic voltammogram according to Example 3. For comparison, FIG. 18 also shows a cyclic voltammogram according to Comparative Example 4 to be described below. In the cyclic voltammogram of FIG. 18, the horizontal axis represents the potential (V) (vs. saturated calomel electrode) and the vertical axis represents the current value (mA). The aluminum ion insertion potential of Example 3 is −1.24V, which is nobler compared with −1.26V of Comparative Example 4. Further, in Example 3, the peak top is clear as compared with Comparative Example 4. Also, the current value after aluminum ion insertion is clearly smaller in Example 3 than in Comparative Example 4. This suggests that in Example 3, water decomposition is suppressed as compared with Comparative Example 4. That is, in the electrode of Example 3, as compared with Comparative Example 4, the insertion reaction of aluminum ions is more ascendant than the generation of hydrogen by electrolysis of water. Therefore, a secondary battery according to Example 3 is superior to that according to the Comparative Example 4 in charge and discharge characteristics and cycle life characteristics.

Comparative Example 1

Comparative Example 1 is an example in which cyclic voltammetry was carried out using $TiO_2$ nanoparticles without surface treatment as a negative electrode active material and an aqueous solution of lithium chloride as an electrolytic solution.

<Production of Negative Electrode>

1.0 g of $TiO_2$ nanoparticles whose average primary particle size was 25 nm as a negative electrode active material, 0.1 g of graphite as a conductive agent, 0.25 g of NMP dispersion of PTFE (solid content: 40% by weight) as a binder (binder resin), and 2.4 g of NMP (N-methyl-2-pyrrolidone) were put into a plastic ointment container. The mixture was mixed for three minutes using a kneading machine to obtain a gray slurry. The slurry was applied onto an Al plate (2 cm×2 cm) whose surface had been anodized using an applicator having a gap thickness of 340 μm. The laminated body with the applied slurry was placed on a hot plate at 120° C. and the solvent was distilled off. Then, the laminated body was pressed with an initial load of 1 $kN/cm^2$ at a sweep rate of 0.5 mm/sec using a small roll press machine. The coating weight of the obtained negative electrode was 21 $g/m^2$.

<Cyclic Voltammetry>

Cyclic voltammetry was carried out in the same manner as described in Example 1, except that the negative electrode according to Comparative Example 1 was used as a working electrode.

Comparative Example 2

Comparative Example 2 is an example in which a constant current charge and discharge test was performed using $TiO_2$ nanoparticles without surface treatment as a negative electrode active material and an aqueous solution of sodium chloride as an electrolytic solution.

<Production of Negative Electrode>

1.0 g of $TiO_2$ nanoparticles having an average primary particle size of 25 nm as a negative electrode active material, 0.1 g of graphite as a conductive agent, 0.25 g of NMP dispersion of PTFE (solid content: 40% by weight) as a binder (binder resin), and 2.1 g of NMP (N-methyl-2-pyrrolidone) were put into a plastic ointment container. The mixture was mixed for five minutes using a kneading machine to obtain a gray slurry. The slurry was applied onto an Al plate (2 cm×2 cm) whose surface had been anodized using an applicator having a gap thickness of 280 μm. The laminated body with the applied slurry was placed on a hot plate at 120° C. and the solvent was distilled off. Then, the laminated body was pressed with an initial load of 1 $kN/cm^2$ at a sweep rate of 0.5 mm/sec using a small roll press machine. Next, the pressed laminated body was dried in a vacuum oven at 130° C. for 1.5 hours to obtain a negative electrode. The obtained negative electrode had a coating weight of 17 $g/m^2$.

<Production of Positive Electrode>

A positive electrode was prepared in the same manner as in Example 2.

<Preparation of Electrolytic Solution>

A saturated solution of sodium chloride was prepared in the same manner as in Example 2.

<Constant Current Charge and Discharge Test>

A constant current charge and discharge test was performed in the same manner as described in Example 2, except that the negative electrode according to Comparative Example 2 was used.

Comparative Example 3

Comparative Example 3 is an example in which a constant current charge and discharge test was performed using a "surface-treated active material 3" described below as a negative electrode active material and an aqueous solution of sodium chloride as an electrolytic solution.

The "surface-treated active material 3" is an active material obtained by causing a silane coupling reaction twice. Details thereof will be described below.

<Surface Treatment of Negative Electrode Active Material> n-propyltrimethoxysilane (1.5 g) as an alkyl-type silane coupling agent and a mixture (50 ml) of ethanol and water as a hydrolysis solvent obtained by mixing at a volume ratio of 9:1 were added to an eggplant type flask (50 ml) equipped with a magnetic stirrer and the solution was stirred at room temperature for one hour. In this way, a solution containing a silane coupling agent was prepared.

An eggplant type flask (100 ml) equipped with a magnetic stirrer was also prepared, and 7.5 g of $TiO_2$ nanoparticles (P25, manufactured by Aerosil) and 20 ml of ethanol were added thereto and stirred to prepare a dispersion. 50 ml of the solution containing the silane coupling agent prepared previously was added to the dispersion and stirred at 60° C. for two hours to cause a silane coupling reaction. After returning the reaction mixture to room temperature, the solvent was removed by suction filtration. The separated solid was subjected to washing as follows. The mixture was put into a beaker (200 ml) equipped with a magnetic stirrer, ethanol (40 ml) was added thereto, and the mixture was stirred at room temperature for 20 minutes. The ethanol was removed by suction filtration and the solid content was separated. The solvent was distilled off from the separated solid under reduced pressure to obtain a white solid.

3.0 g of the obtained white solid was put into the eggplant type flask (100 ml) equipped with a magnetic stirrer and a mixture (20 ml) in which ethanol and water was mixed at a volume ratio of 9:1 was added thereto to obtain a dispersion.

An eggplant type flask (50 ml) with a magnetic stirrer was also prepared, and n-propyltrimethoxysilane (0.67 g) as an alkyl type silane coupling agent and a mixture (20 ml) of ethanol and water obtained by mixing at a volume ratio of 9:1 were put thereinto and stirred at room temperature for one hour to obtain a mixed solution.

The mixed solution was added to the dispersion containing the white solid prepared previously and stirred at 60° C. for two hours to cause a silane coupling reaction. After returning the reaction mixture to room temperature, the solvent was removed by suction filtration. The separated solid was subjected to washing as follows. The mixture was put into a beaker (100 ml) equipped with a magnetic stirrer, ethanol (30 ml) was added thereto, and the mixture was stirred at room temperature for 15 minutes. The ethanol was removed by suction filtration and the solid content was separated. The solvent was distilled off from the separated solid under reduced pressure to obtain the surface-treated active material 3.

<Infrared Absorption Spectrum Measurement>

Infrared absorption spectra were measured by the KBr tablet method using TabletMaster manufactured by JASCO ENGINEERING according to the infrared spectroscopy (IR) described in the first embodiment. FIG. 19 shows the infrared absorption spectrum of the surface-treated active material 3. Further, FIG. 20 shows a difference spectrum obtained by subtracting the spectrum of the untreated active material shown in FIG. 11 from the spectrum of the surface-treated active material 3.

As is clear from the spectrum of FIG. 20, in the surface-treated active material 3, a peak (third peak $P_C$) of CH stretching vibration derived from the alkyl-based silane coupling agent appeared. Also, a peak of Si—O stretching vibration derived from a bonding portion between the $TiO_2$ surface and the alkyl-based silane coupling agent appeared. That is, it is clear that the surface-treated active material 3 is active material particles obtained as a result of silane coupling reaction.

Also, as shown in FIG. 19, the first peak $P_A$, which is the maximum peak present within the range of 3200 $cm^{-1}$ to 3600 $cm^{-1}$, and the second peak $P_B$, which is the maximum peak present within the range of 565 $cm^{-1}$ to 570 $cm^{-1}$, appeared in the infrared absorption spectrum of the surface-treated active material 3. The second peak $P_B$ appeared at a position of 567 $cm^{-1}$.

However, the peak intensity $I_A$ of the first peak $P_A$ was 0.0503. The peak intensity $I_B$ of the second peak $P_B$ was 0.6066. Therefore, for the surface-treated active material 3, the ratio $I_B/I_A$ of the intensity $I_B$ of the second peak $P_B$ to the intensity $I_A$ of the first peak $P_A$ was 12. That is, for the surface-treated active material 3, the ratio $I_B/I_A$ of the intensity $I_B$ of the second peak $P_B$ to the intensity $I_A$ of the first peak $P_A$ was not within the range of 4 to 10. Incidentally, the peak intensity $I_A$ of the first peak $P_A$ and the peak intensity $I_B$ of the second peak $P_B$ represent the height from the baseline 50 to each peak top shown in FIG. 19.

Thus, even when washing with ethanol or the like is performed after the silane coupling reaction, if the active material surface is excessively covered by the silane coupling reaction, the ratio $I_B/I_A$ may exceed 10.

<Constant Current Charge and Discharge Test>

A constant current charge and discharge test was performed in the same manner as described in Example 2, except that the negative electrode according to Comparative Example 3 was used. The test was performed five times, but the battery did not operate in none of the tests.

Comparative Example 4

Comparative Example 4 is an example in which cyclic voltammetry was carried out using $TiO_2$ nanoparticles without surface treatment as a negative electrode active material and an aqueous solution of aluminum chloride as an electrolytic solution.

<Production of Negative Electrode>

A negative electrode was produced in the same manner as in Comparative Example 2. That is, as the active material of the negative electrode according to Comparative Example 4, $TiO_2$ nanoparticles having an average primary particle size of 25 nm as an untreated active material was used.

<Cyclic Voltammetry>

Cyclic voltammetry was carried out in the same manner as described in Example 3, except that the negative electrode produced in Comparative Example 2 was used as a working electrode and the aqueous solution of aluminum chloride prepared in Example 3 was used as an electrolytic solution.

Table 1 below summarizes the types of negative electrode active materials used in Examples 1 to 3 and Comparative Examples 1 to 4, the types of carrier ions, and methods for evaluating battery characteristics. In the column of "Battery characteristics evaluation method", "CV" means cyclic voltammetry. Table 1 also shows the peak intensity $I_A$ and the peak intensity $I_B$ determined from the infrared absorption spectrum of the negative electrode active material used in each example and the ratio $I_B/I_A$.

TABLE 1

|  | Negative electrode active material | Carrier ion | Battery characteristics evaluation method | Peak intensity $I_A$ | Peak intensity $I_B$ | Ratio $I_A/I_B$ |
| --- | --- | --- | --- | --- | --- | --- |
| Example 1 | Surface-treated active material 1 | Li ion | CV | 0.03842 | 0.1708 | 4 |
| Example 2 | Surface-treated active material 2 | Na ion | Charge and discharge test | 0.0375 | 0.3888 | 10 |
| Example 3 | Surface-treated active material 2 | Al ion | CV | 0.0375 | 0.3888 | 10 |
| Comparative Example 1 | $TiO_2$(Untreated) | Li ion | CV | 0.05744 | 0.1964 | 3 |
| Comparative Example 2 | $TiO_2$(Untreated) | Na ion | Charge and discharge test | 0.05744 | 0.1964 | 3 |
| Comparative Example 3 | Surface-treated active material 3 | Na ion | Charge and discharge test | 0.0503 | 0.6066 | 12 |
| Comparative Example 4 | $TiO_2$(Untreated) | Al ion | CV | 0.05744 | 0.1964 | 3 |

That the battery characteristics according to Example 1 were superior to those of Comparative Example 1 is as described in Example 1. That the battery characteristics according to Example 2 were superior to those of Comparative Example 2 is as described in Example 2. Also, the battery according to Comparative Example 3 did not operate, as described above. That the battery characteristics according to Example 3 were superior to those of Comparative Example 4 is as described in Example 3.

When the ratio $I_B/I_A$ is in the range of 4 to 10 as in Examples 1 to 3, the charge and discharge characteristics and the cycle life characteristics are excellent. Further, as is clear from Examples 1 to 3, it turns out that good battery characteristics are exhibited even when carrier ions change.

As shown in Comparative Example 3, even when the negative electrode active material that caused the silane coupling reaction was used, it turns out that the battery characteristics remarkably deteriorate if the ratio $I_B/I_A$ is out of the range of 4 to 10.

In addition, even when an active material silane-coupled by using an alkyl type silane coupling agent for lithium titanium composite oxide, sodium titanium composite oxide, aluminum titanium composite oxide or niobium titanium composite oxide, instead of titanium dioxide, as the negative electrode active material, excellent charge and discharge characteristics and cycle life characteristics can be achieved.

According to at least one of the embodiment and Examples described above, a secondary battery is provided. The secondary battery includes a positive electrode, a negative electrode including titanium oxide particles, and an aqueous electrolyte. The surfaces of the titanium oxide particles are partially covered with an alkyl-based silane compound. The ratio $I_B/I_A$ of the intensity $I_B$ of the second peak $P_B$ to the intensity $I_A$ of the first peak $P_A$ is within a range of 4 to 10. The first peak $P_A$ is a maximum peak present within a range of 3200 $cm^{-1}$ to 3600 $cm^{-1}$ in an infrared absorption spectrum of the titanium oxide particles obtained by infrared spectroscopy. The second peak $P_B$ is a maximum peak present within a range of 565 $cm^{-1}$ to 570 $cm^{-1}$ in the infrared absorption spectrum. Therefore, according to the secondary battery, excellent charge and discharge characteristics and cycle life characteristics can be achieved.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising: a positive electrode; a negative electrode comprising titanium oxide particles; and an aqueous electrolyte, wherein
    surfaces of the titanium oxide particles are partially covered with an alkyl-based silane compound comprising at least one selected from the group consisting of methyltrimethoxysilane, propyltrimethoxysilane, hexyltrimethoxysilane, decyltrimethoxysilane, trimethoxy (3,3,3-trifluoropropyl) silane, dimethyldimethoxysilane, methyltriethoxysilane, and dimethyldiethoxysilane, and
    a ratio $I_B/I_A$ of an intensity $I_B$ of a second peak $P_B$ to an intensity $I_A$ of a first peak $P_A$ is within a range of 4 to 10, where
    the first peak $P_A$ is a maximum peak present within a range of 3200 $cm^{-1}$ to 3600 $cm^{-1}$ in an infrared absorption spectrum of the titanium oxide particles obtained by infrared spectroscopy, and the second peak $P_B$ is a maximum peak present within a range of 565 $cm^{-1}$ to 570 $cm^{-1}$ in the infrared absorption spectrum.

2. The secondary battery according to claim 1, wherein the infrared absorption spectrum comprises a third peak $P_C$, which is present within a range of 2800 $cm^{-1}$ to 3000 $cm^{-1}$.

3. The secondary battery according to claim 1, wherein the alkyl-based silane compound comprises an alkyl group, and
    the alkyl group is hydrocarbon having one to 10 carbon atoms.

4. The secondary battery according to claim 1, wherein the titanium oxide particles comprise at least one oxide selected from a group consisting of titanium dioxide, lithium titanium composite oxide, sodium titanium composite oxide, aluminum titanium composite oxide, and niobium titanium composite oxide.

5. The secondary battery according to claim 4, wherein the titanium oxide particles comprise the titanium dioxide.

6. The secondary battery according to claim 1, wherein the negative electrode comprises the titanium oxide particles as a negative electrode active material, and the coverages of the surfaces of the titanium oxide particles with the alkyl-based silane compound is in a range of 0.5% by mass to 1.0% by mass with respect to the total mass of the negative electrode active materials.

7. The secondary battery according to claim 1, wherein the alkyl-based silane compound comprises at least one selected from the group consisting of a methyl group, an ethyl group, or a propyl group.

8. The secondary battery according to claim 1, wherein surfaces of the titanium oxide particles are partially covered with at least one alkyl-based silane compound selected from the group consisting of methyltrimethoxysilane, propyltrimethoxysilane, trimethoxy(3,3,3-trifluoropropyl)silane, dimethyldimethoxysilane, methyltriethoxysilane, and dimethyldiethoxysilane.

9. The secondary battery according to claim 1, wherein surfaces of the titanium oxide particles are partially covered with at least one alkyl-based silane compound selected from the group consisting of hexyltrimethoxysilane and decyltrimethoxysilane.

10. A battery pack comprising the secondary battery according to claim 1.

11. The battery pack according to claim 10, further comprising: an external power distribution terminal; and a protective circuit.

12. The battery pack according to claim 10, comprising plural of the secondary battery, wherein the secondary batteries are electrically connected in series, in parallel, or in a combination of series connection and parallel connection.

13. A vehicle comprising the battery pack according to claim 10.

14. A stationary power supply comprising the battery pack according to claim 10.

* * * * *